United States Patent [19]

Lee et al.

[11] Patent Number: 5,800,931
[45] Date of Patent: Sep. 1, 1998

[54] MAGNETIC RECORDING MEDIUM WITH A MGO SPUTTER DEPOSITED SEED LAYER

[75] Inventors: Li-Lien Lee; David N. Lambeth; David E. Laughlin, all of Pittsburgh, Pa.; Byung-Ki Cheong, Seoul, Rep. of Korea

[73] Assignee: Carnegie Mellon University, Pittsburgh, Pa.

[21] Appl. No.: 553,893

[22] Filed: Nov. 6, 1995

Related U.S. Application Data

[63] Continuation-in-part of Ser. No. 315,096, Sep. 29, 1994.
[51] Int. Cl.$^6$ ............................................. G11B 5/66
[52] U.S. Cl. ..................... 428/611; 428/65.3; 428/336; 428/471; 428/668; 428/673; 428/674; 428/694 TS; 428/694 TP; 428/694 TM; 428/900; 360/103; 360/135
[58] Field of Search ........................... 428/65.3, 336, 428/611, 668, 673, 674, 694 TS, 694 TP, 694 TM, 900, 471; 360/103, 135

[56] References Cited

U.S. PATENT DOCUMENTS

| | | | |
|---|---|---|---|
| 3,615,911 | 10/1971 | Nesbitt et al. | 148/31.57 |
| 4,287,225 | 9/1981 | Kneller et al. | 427/48 |
| 4,560,624 | 12/1985 | Guttner et al. | 428/632 |
| 4,652,499 | 3/1987 | Howard | 428/641 |
| 4,735,840 | 4/1988 | Hedgcoth | 428/65 |
| 4,820,584 | 4/1989 | Morita et al. | 428/336 |
| 4,833,020 | 5/1989 | Shiroishi et al. | 428/336 |
| 4,883,711 | 11/1989 | Shiroishi et al. | 428/336 |
| 4,902,583 | 2/1990 | Brucker et al. | 428/665 |
| 5,057,200 | 10/1991 | Lal et al. | 204/192.15 |
| 5,062,021 | 10/1991 | Ranjan et al. | 360/135 |
| 5,118,564 | 6/1992 | Shinohara et al. | |
| 5,147,732 | 9/1992 | Shiroishi et al. | 428/668 |
| 5,192,626 | 3/1993 | Sekiya et al. | 428/694 |
| 5,231,294 | 7/1993 | Takeuchi et al. | 257/28 |
| 5,344,706 | 9/1994 | Lambeth et al. | |
| 5,363,794 | 11/1994 | Lairson et al. | 117/7 |
| 5,403,547 | 4/1995 | Smith et al. | 420/581 |

FOREIGN PATENT DOCUMENTS 63-300508  3/1990  Japan.

OTHER PUBLICATIONS

K. Hono, B. Wong, and D.E. Laughlin, Crystallography of Co/Cr Bilayer Magnetic Thin Films, Nov. 1, 1990, J. Appl. Phys. 68 (9), 1990 American Institute of Physics, pp. 4734–4740.

N. Tani, M. Hashimoto, Y. Murata, M. Ishikawa, Y. Ota, and K. Nakamura, Effects of Substituted Elements Into the Cr Layer on a CoNiCr/Cr Sputtered Hard Disk, Jun. 15, 1990, J. Appl. Phys. 67 (12), 1990 American Institute of Physics, pp. 7507–7509.

Rajiv Ranjan, Beta Tungsten Underlayer for Low–noise Thin–film Longitudinal Media, May 1, 1990, J. Appl. Phys. 67, (9), 1990 American Institute of Physics, pp. 4698–4700.

T. Kogure and S. Katayama, High–Coercivity Magnetic Hard Disks Using Glass Substrates, May 1, 1990, J. Appl. Phys. 67 (9), 1990 American Institute of Physics, pp. 4701–4703.

Jack H. Judy, Thin Film Recording Media, Mar. 1990, MRS Bulletin, pp. 63–72.

(List continued on next page.)

*Primary Examiner*—Stevan A. Resan
*Attorney, Agent, or Firm*—Kirkpatrick & Lockhart LLP

[57] ABSTRACT

The present invention provides a longitudinal magnetic recording media having a substrate, a sputter deposited MgO seed layer, a Co or Co alloy based magnetic layer and an underlayer disposed between the seed layer and the magnetic layer comprised of Cr, a Cr alloy or a material having a B2 ordered crystalline structure, preferably NiAl or FeAl. A thin Cr or Cr alloy intermediate layer of about 1.0 nm to 5.0 nm thick may be positioned between the underlayer and the magnetic layer.

26 Claims, 24 Drawing Sheets

OTHER PUBLICATIONS

B.R. Natarajan and E.S. Murdock, Magnetic and Recording Properties of Sputtered Co–P/Cr Thin Film Media, Nov. 1988, IEEE Transactions of Magnetics, vol. 24, No. 6, pp. 2724–2726.

J.A. Christner, R. Ranjan, R.L. Peterson, and J.I. Lee, Low–Noise Metal Medium for High–Density Longitudinal Recording, Apr. 15, 1988, J. Appl. Phys. 63 (8), 1988 American Institute of Physics, pp. 3260–3262.

Nathan R. Belk, Peter K. George, and Greg S. Mowry, Measurement of the Intrinstic Signal–To–Noise Ratio for High–Performance Rigid Recording Media, Jan. 15, 1986, J. Appl. Phys. 59 (2), 1986 American Institute of Physics, pp. 557–563.

J.K. Howard, Thin Films for Magnetic Recording Technology: A Review, Critical Review, Jan./Feb. 1986, J. Vac. Sci. Technol. A, vol. 4 No. 1, pp. 1–13.

Jacques Daval and Denis Randet, Electron Microscopy on High–Coercive–Force Co–Cr Composite Films, Dec. 1970, IEEE Transactions of Magnetics, vol. Mag.–6, No. 4, pp. 768–207.

E. Y. Chuang and W. Tang, Elimination of CFC in Thin–Film Disk Manufacturing, Third Quarter Aug. 1991, Access Selected Topics in Storage Technology, IBM San Jose, vol. V, No. 3, pp. 1–12.

Masaaki Futamoto, Mikio Suzuki, et al., Magnetic and Recording Characteristics of Bicrystalline Longitudinal Recording Medium Formed on an $M_gO$ Single Crystal Disk Substrate, IEEE Transactions on Magnetics, vol. 30, No. 6, Nov. 1994, p. 3975.

T. Yamashita, L.H. Cham et al., Sputtered $Ni_xP$ Underlayer for CoPt–Based Thin Film Magnetic Media, IEEE Transactions on Magnetics, vol. 27, No. 6, Nov. 1991.

Atsushi Nakamura and Masaaki Futamoto, Epitaxial Growth of Co/CR Bilayer Films on $M_gO$ Single Crystal Substrates, Jpn. J. Appl. Phys. vol. 32, Oct. (1993), Pt. 2, No. 10A, L1410.

R. Ranjan, D. N. Lambeth, M. Tromel, P. Goglia and Y. Li, Laser Texturing For Low–Flying–Height Media, J.Appl. Phys. 69 (8), 15 Apr. 1991, p. 5745.

NiAl, B2
a=.2887

Cr, BCC
a=.2884

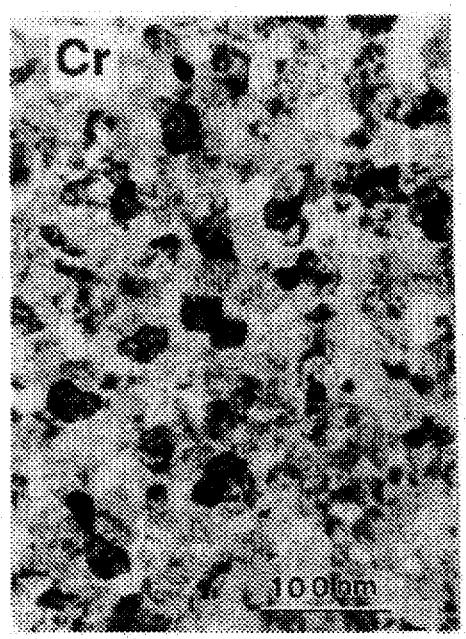
FIG. 3(b)   Cr
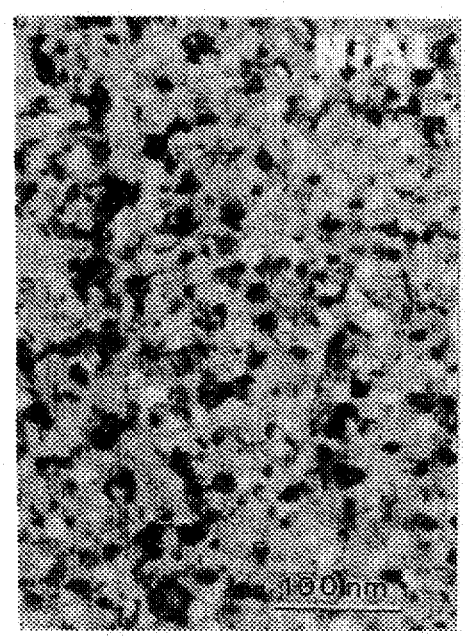
FIG. 3(a)   NiAl

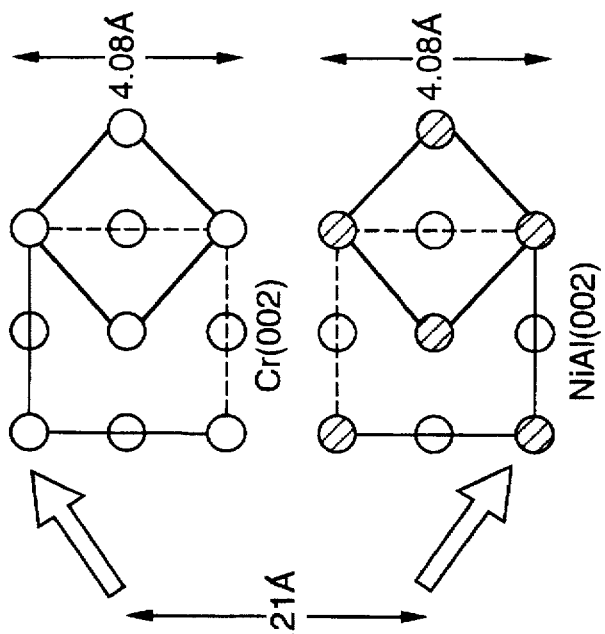
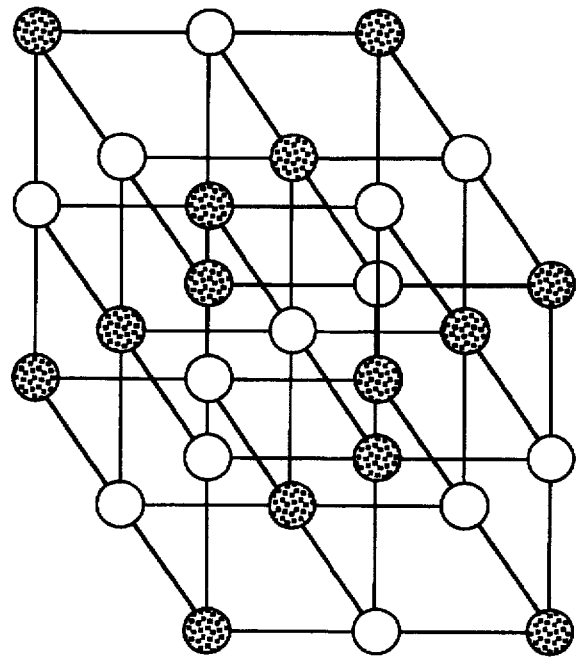
FIG. 18(a)
FIG. 18(b)
FIG. 18(c)

Cr, 100nm/ glass

Cr, 100nm/ MgO, 5nm/ glass

Cr, 100nm/ MgO,50nm/ glass

MAGNETIC RECORDING MEDIUM WITH A MGO SPUTTER DEPOSITED SEED LAYER

This is a continuation-in-part of application Ser. No. 08/315,096 filed Sep. 29, 1994 (pending).

This work was supported in part under a National Science Foundation grant, No. ECD-8907068. The government has certain rights to this invention.

BACKGROUND OF THE INVENTION

1. Field of the Invention

The present invention relates to thin films for longitudinal magnetic recording media, and more particularly, to B2-structured underlayers for use with a cobalt or cobalt alloy based magnetic layer.

2. Invention Background

There is an ever increasing demand for magnetic recording media with higher storage capacity, lower noise and lower costs. Recording densities in computers have increased steadily over the last two decades.

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments. The structure of disc drives is well known.

The structure of a typical thin film disk is multilayered and includes a substrate at its base covered by an underlayer, a magnetic layer and optionally, an overlayer at the top. The overlayer may be coated with an overcoat and an organic lubricant. The magnetic layer is the main body on which the magnetic bits are recorded. Longitudinal recording media comprised of cobalt or cobalt alloy-based magnetic films having a chromium or chromium alloy-based underlayer deposited on a nonmagnetic substrate have become the industry standard.

Important magnetic properties, such as coercivity (Hc), remanent magnetization (Mr) and coercive squareness (S*), which are crucial to the recording performance of the Co alloy thin film for a fixed composition, depend primarily on its microstructure. For thin film longitudinal magnetic recording media, the desired crystalline structure of the Co and Co alloys is hexagonal close packed (HCP) with uniaxial crystalline anisotropy and a magnetization easy direction along the c-axis is in the plane of the film. The better the in-plane c-axis crystallographic texture, the higher the coercivity of the Co alloy thin film used for longitudinal recording. This is required to achieve a high remanence. For very small grain sizes coercivity increases with increased grain size. Large grains, however, results in greater noise. There is a need to achieve high coercivities without the increase in noise associated with large grains. To achieve a low noise magnetic medium, the Co alloy thin film should have uniform small grains with grain boundaries which can magnetically isolate neighboring grains. This kind of microstructure and crystallographic texture is normally achieved by manipulating the deposition process, by grooving the substrate surface, or most often by the proper use of an underlayer.

Underlayers can strongly influence the crystallographic orientation, the grain size and chemical segregation at the Co alloy grain boundaries. Underlayers which have been reported in the literature include Cr, Cr with an additional alloy element X (X=C, Mg, Al, Si, Ti, V, Co, Ni, Cu, Zr, Nb, Mo, La, Ce, Nd, Gd, Tb, Dy, Er, Ta, and W), Ti, W, Mo, and NiP. While there would appear to be a number of underlayer materials available, in practice, only a very few work well enough to meet the demands of the industry. Among them, the most often used and the most successful underlayer is pure Cr. For high density recording, in plane orientation has heretofore been achieved by grain-to-grain epitaxial growth of the HCP Co alloy thin film on a body centered cubic (BCC) Cr underlayer. The polycrystalline Co-based alloy thin film is deposited with its c-axis, the [0002] axis, either parallel to the film plane or with a large component of the c-axis in the film plane. It has been shown by K. Hono, B. Wong, and D. E. Laughlin, "Crystallography of Co/Cr bilayer magnetic thin films", Journal of Applied Physics 68 (9) p. 4734 (1990), that BCC Cr underlayers promote grain-to-grain epitaxial growth of HCP Co alloy thin films deposited on these underlayers. The heteroepitaxial relationships between Cr and Co which bring the $[0002]_{Co}$ axis down or close to the film plane are $(002)_{Cr}//(11\bar{2}0)_{Co}$, $(110)_{Cr}//(10\bar{1}1)_{Co}$, $(110)_{Cr}//(10\bar{1}0)_{Co}$, and $(112)_{Cr}//(10\bar{1}0)_{Co}$. Different Co/Cr epitaxial relationships prevail for different deposition processes. To obtain a good BCC structure which promotes the formation of the HCP structure, the Cr underlayer must be thicker than about 100 Å. U.S. Pat. No. 4,652,499 discloses efforts to improve the underlayer by adding vanadium (V) to Cr to change its lattice constant and thereby to promote a better lattice matching between the HCP Co alloys, CoPt or CoPtCr, and the BCC CrV underlayer.

In perpendicular magnetic recording media, a thin film layer which is sometimes called a precoat or a seed layer, is commonly deposited between the substrate and the underlayer to isolate the underlayer from possible substrate contaminants.

Materials used for this layer with varying degrees of success include Al, Ti, $Ni_3P$, $TiSi_2$, Cr, C, Ta, W and Zr. A. Nakamura and M. Futamoto, "Epitaxial Growth of Co/Cr Bilayer Films on MgO Single Crystal Substrates", J. Applied Physics, Vol. 32, part 2, No. 10A, L1410 (October, 1993) describes a Co film deposited on a single crystal MgO (002). A $(11\bar{2}0)$ bicrystalline longitudinal magnetic recording medium, CoCrPt/Cr, formed on a MgO single crystal disk substrate is described in M. Futamoto et al., "Magnetic and recording characteristic of bicrystalline longitudinal recording media formed on an MgO single crystal disc substrate", IEEE Transactions on Magnetics, Vol. 30, No. 6, p.3975 (1994). Because of the anisotropic magnetic properties and hence, the recording properties, around the circumference of the single crystal disk, this disk is of limited utility.

The need for lighter, smaller and better performing computers with greater storage density demands higher density hard disk media. It is an object of the present invention to meet those demands with a longitudinal magnetic recording media having high coercivity and low noise.

SUMMARY OF THE INVENTION

The object of the invention is satisfied by a recording media incorporated in a disc drive having a rotatable disc for operation in conjunction with magnetic transducing heads for the recording and reading of magnetic data. The improved recording media has a novel seed layer on which to induce the (002) crystallographic texture in an underlayer for the magnetic film of the media. The magnetic recording medium of the invention is comprised of a substrate, a magnetic layer, preferably formed from Co or Co alloy film, and a seed layer comprised of a material having a B1-ordered crystalline structure with a (002) texture, such as MgO, sputter deposited on the substrate. An underlayer is also provided which is comprised of a material having either an A2 structure or a B2- ordered crystalline structure disposed between the seed layer and the magnetic layer. The A2 phase is preferably Cr or a Cr alloy, such as CrV. The B2 phase is selected from the group consisting of NiAl, AlCo, FeAl, FeTi, CoFe, CoTi, CoHf, CoZr, NiTi, CuBe, CuZn, AlMn, AlRe, AgMg, and $Al_2FeMn_2$, and is most preferably FeAl or NiAl.

The underlayer may be formed in multiple layers wherein each layer is a different one of the foregoing materials. The Co or Co alloy used as the magnetic layer has a hexagonal close packed (HCP) structure and is deposited with its c-axis, the magnetic easy axis (the direction in which it is easily magnetized), substantially parallel to the plane of the magnetic layer.

The recording medium may also include a chromium or chromium alloy intermediate layer interposed between the magnetic layer and the underlayer. The intermediate layer is relatively thin, preferably between about 10 to 500 Å. Thinner layers can provide some improvement provided the layer is thick enough to form a substantially continuous layer on the surface of the underlayer.

The magnetic layer may be covered by an overlayer which in turn may be covered by an overcoat. An organic lubricant is preferably added over the overcoat.

In an alternative arrangement, there may be a first magnetic layer and a second magnetic layer with one or more interlayers disposed between the two magnetic layers. The interlayer is typically Cr, of about 10 to 40 Å. The second magnetic layer may be covered by the overlayer/overcoat/lubricant layers described above.

Materials with the B2 structure are ordered structural derivatives of the body centered cubic (BCC) structure, which is the structure of Cr. NiAl, for example, is a Hume-Rothery β-phase electron compound with a valence electron/atom ratio of 3/2 which gives a B2 crystalline structure, shown in FIG. 2(b). NiAl has a lattice constant of 0.2887 nm, almost identical to that of Cr, 0.2884 nm. By placing the B2- ordered structure on the substrate, below the magnetic layer, the Co or Co alloy films, when deposited, either directly or through an intermediate Cr or Cr alloy layer, grow epitaxially at the B2 interface and reorient the HCP c-axis away from being random or normal to the film plane, yielding a stable, improved thin film microstructure with magnetic properties which are particularly well suited to high density recording. NiAl, for example, maintains its B2 structure stable up to the melting point of 1911 K and the structure does not change over a wide composition range from 41.5 to 55 at % Al at 673 K. Strong bonding between the metallic atoms slows the atomic mobility during the film's deposition thereby yielding a smaller grain size film than is present with the Cr underlayer. A small grain size can benefit the recording properties of the media by increasing the number of grains per unit area and hence, lowering the media noise.

In addition, NiAl is nonmagnetic with an extremely low magnetic susceptibility, on the order of $2 \times 10^{-7}$ to $5 \times 10^{-7}$ emu/g, has good thermal conductivity, high stiffness, and good environmental corrosion resistance.

BRIEF DESCRIPTION OF THE DRAWINGS

The advantages of the present invention can be better understood by reference to the drawings in which:

FIG. 3(a) and (b) show the bright field TEM micrographs of a 100 nm NiAl film (a) and a 100 nm Cr film (b);

FIG. 18 (a)–(c) show the crystal structure of the MgO, and the lattice match of the atomic planes MgO (002) with Cr (002) and NiAl (002), respectively;

DETAILED DESCRIPTION OF THE PREFERRED EMBODIMENT

The recording media of the invention may be a rigid magnetic disc rotatable about an axis that is incorporated into a disc drive (not shown). Typically, the disc drive includes a magnetic transducing head, or slider, which is supported on a movable arm which is in turn part of a suspension assembly for moving the head over the surface of the disc. The transducing head, when moving over the surface of the disc during normal operation, is maintained in a spaced, parallel relationship relative to the surface of the disc, in close proximity to the disc. A typical distance is 10 μin or less. Disc drives such as this are standard equipment in the industry. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs using known flexible substrates.

Figure 1C:
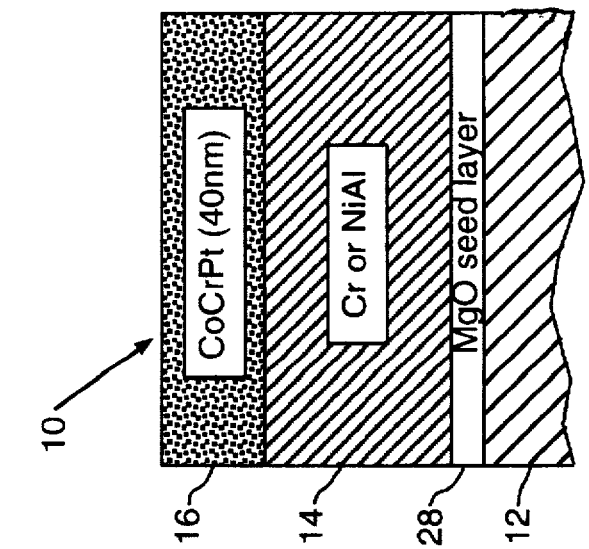
FIG. 1(a)–(c) are schematic illustrations of embodiments of a multilayer structure of the thin film disk of the present invention.
Figure 1B:
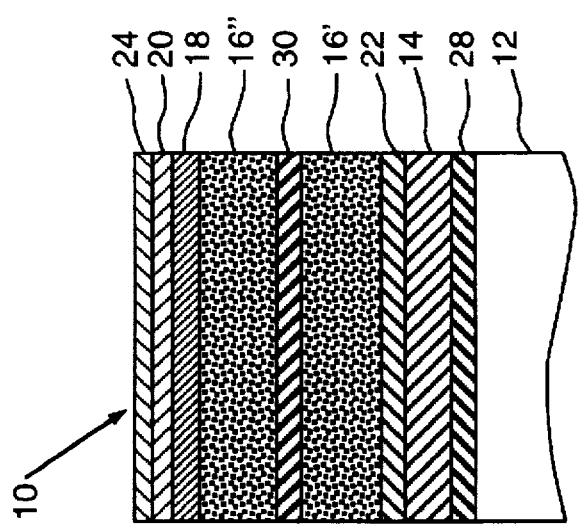
Figure 1A:
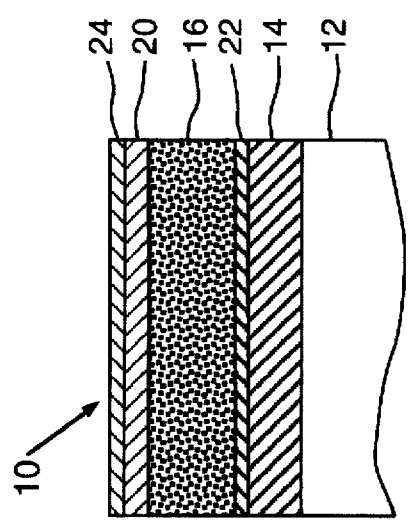

Referring to FIG. 1(a), the magnetic recording medium 10 of the present invention, which is incorporated into the disc drive, is comprised of a substrate 12, an underlayer 14 and a magnetic layer 16. In addition, there maybe an overcoat 20, as shown. An intermediate layer 22 of Cr may be disposed between the underlayer 14 and the magnetic layer 16. An organic lubricant 24 is preferably applied to the overcoat 20.

In an alternative arrangement, shown in FIG. 1(b), there may be first and second magnetic layers, 16' and 16", and one or more interlayers 30 disposed between the first magnetic layer 16' and a second magnetic layer 16". The interlayer 30 is preferably made of Cr and is about 1 nm to 4 nm (10 to 40 Å) thick. The second magnetic layer 16" is covered by an overlayer 18, the overcoat 20, and the organic lubricant 24 shown in FIG. 1(a). A seed layer 28 about 1.0 nm to 50 nm (10 to 500 Å) thick may be disposed between the substrate 12 and the underlayer 14 to nucleate growth. The seed layer 28 may be made of Cr.

In another preferred embodiment of the recording media of the present invention shown in FIG. 1(c), the seed layer 28 is a B1- ordered crystalline structure with a (002) texture sputter deposited on the substrate beneath the underlayer. The preferred seed layer of this embodiment is a thin layer of MgO having a (002) texture when sputter deposited on the substrate. The seed layer forms a substantially continuous layer up to 50 nm in thickness, and preferably up to 20 nm in thickness. In the preferred embodiment, the seed layer is about 1.0 nm to 50 nm (10 to 500 Å) in thickness, and preferably between about 1.0 nm to 20 nm (10 to 200 Å) in thickness, more preferably about 2.5 to 20 nm (25 to 200 Å) in thickness, and most preferably between about 2.5 nm to 10 nm (25 to 100 Å) in thickness.

In the preferred embodiment, the substrate 12 is formed of a nonmagnetic material, such as glass, silicon or an aluminum alloy coated with NiP. Alternative hard disk substrates such as canasite, or SiC may be used.

The magnetic layers 16, 16' and 16", are deposited with the longitudinal magnetic easy axis thereof substantially parallel to the plane of such magnetic layer, are preferably a Co or Co alloy film, such as CoCr, SmCo, CoP, CoPt, CoNiCr, CoNiPt, CoCrTaSi, CoCrPtSi, CoCrPtB, CoCrPtTa, or other known Co alloy magnetic films and are each about 5–60 nm (50–600 Å) thick.

Figure 2B:
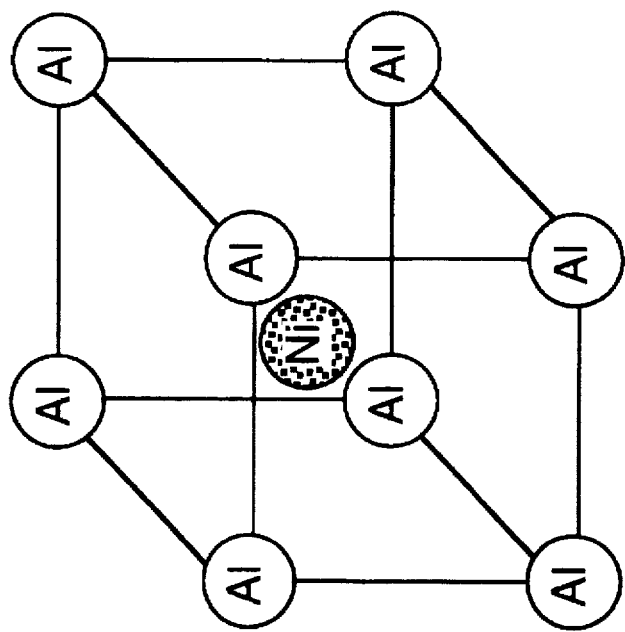
FIG. 2(a) and (b) depict the crystal structures of Cr (BCC) and NiAl (B2), respectively.
Figure 2A:
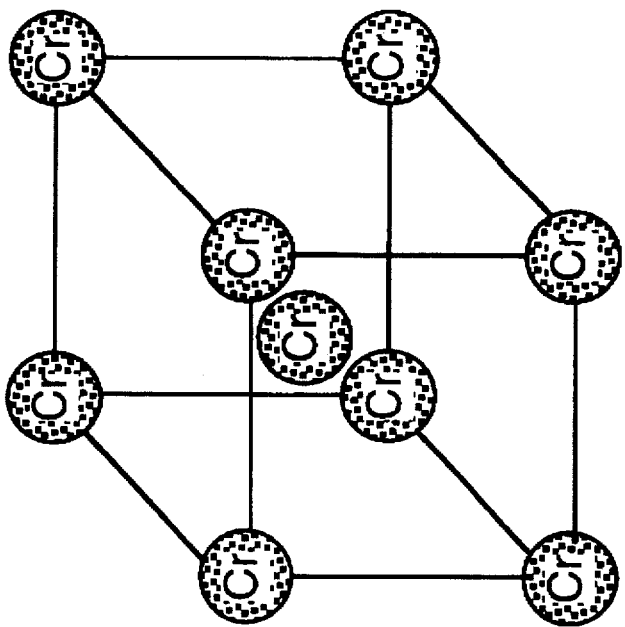

The B2- ordered crystalline structure of the underlayer 14 is shown in FIG. 2(b). The underlayer 14 is most preferably NiAl. It is about 10–200 nm (100–2000 Å) thick. Alternatively, the underlayer may be FeAl, or multiple layers, alternating between a NiAl layer and a FeAl layer. Other phases having a B2- ordered structure and lattice constants close to that of NiAl (a=0.2887 nm), FeAl (a=0.291 nm) and Cr (a=0.2884 nm) (which is not itself a B2- ordered structure) are also considered to be good candidates, for the underlayer of the present invention. The materials are AlCo (a=0.286 nm), FeTi (a=0.298), CoFe (a=0.285 nm), CoTi (a=0.299 nm), CoHf (a=0.316 nm), CoZr (a=0.319 nm), NiTi (a=0.301 nm), CuBe (a=0.270 nm), CuZn (a=0.295 nm), AlMn (a=0.297 nm), AlRe (a=0.288 nm), AgMg (a=0.328 nm), and $Al_2FeMn_2$ (a=0.296 nm). It is anticipated that an underlayer comprised of two or more layers of different materials within the foregoing list may be used. For example, it is believed that a multiple layer having a first layer of NiAl and a second layer of FeAl, AlCo, FeTi, CoFe, CoTi, CoHf, CoZr, NiTi, CuBe, CuZn, AlMn, AlRe, AgMg or $Al_2FeMn_2$ may be used. Various combinations of multiple layers wherein each layer is one of the B2- ordered crystalline phases may be employed as the underlayer of the present invention.

In the embodiment of the invention shown in FIG. 1(c) having a sputter deposited (002) MgO seed layer, the underlayer may be the B2- ordered material described above or may be an A2 structure, such as Cr or a Cr alloy, such as CrV.

An overlayer 18, which is thought to prevent corrosion, may be provided adjacent to and preferably in contact with the magnetic layer 16 or 16". The overlayer 18 is 1–10 nm (10–100 Å) thick and may be made of W, Ta, Zr, Ti, Y, Pt, Cr or any combination thereof.

An overcoat 20 may be provided external to the overlayer 18, so that the overlayer 18 is positioned between the magnetic layer 16 or 16" and the overcoat 20, as shown in FIGS. 1(a) and (b). The overcoat provides a mechanical wear layer and is 2.5–30 nm (25–300 Å) thick. It is preferably made of a ceramic material or diamond like carbon, such as $SiO_2$, SiC, CN, $ZrO_2$ or C. An organic lubricant 24 may be disposed on the overcoat 20. The lubricant is 1 nm to 30 nm (10 to 300 Å) thick and is preferably a fluorochlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

To compare the in-plane magnetic properties of one embodiment of the magnetic recording medium of the present invention, CoCrTa and CoCrPt films were sputter-deposited onto Cr or NiAl underlayers on glass substrates by techniques well known to those skilled in the art. Vibrating sample magnetometry (VSM) was used to measure the magnetic properties. In the following experimental examples, RF diode sputtering was used for film deposition onto smooth glass substrates which were not mechanically textured.

A 100 nm NiAl film was deposited onto a glass substrate. Its microstructure, as observed by transmission electron microscopy (TEM), is compared with a similarly deposited Cr film and shown in FIGS. 3a and 3b. The NiAl film, FIG. 3a shows a grain size of about 15 nm which is noticeably smaller (about 50%) than the grain size of the similarly sputter deposited Cr film, FIG. 3b. The grain size of the underlayer strongly influences the grain size of the Co based magnetic layer. It is believed that the strong atomic bonding within the two atom structure of NiAl inhibits the mobility of the Ni and Al atoms and so limits the growth of the grains. The small, well faceted grains of NiAl promote the formation of smaller, more well defined grains in the magnetic layer. Smaller grains reduce noise in the recording media.

Figure 4A:
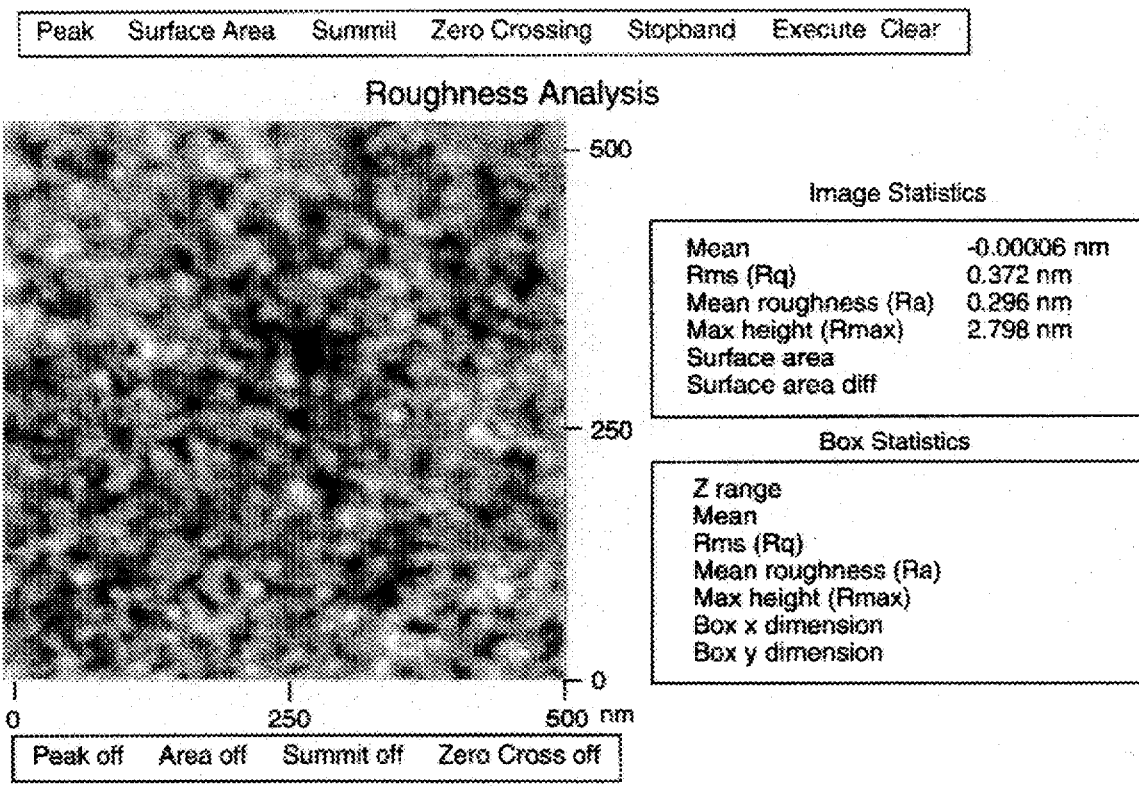
FIG. 4(a) and (b) show atomic force microscope (AFM) views of a NiAl film (a) and a Cr film (b)
Figure 4B:
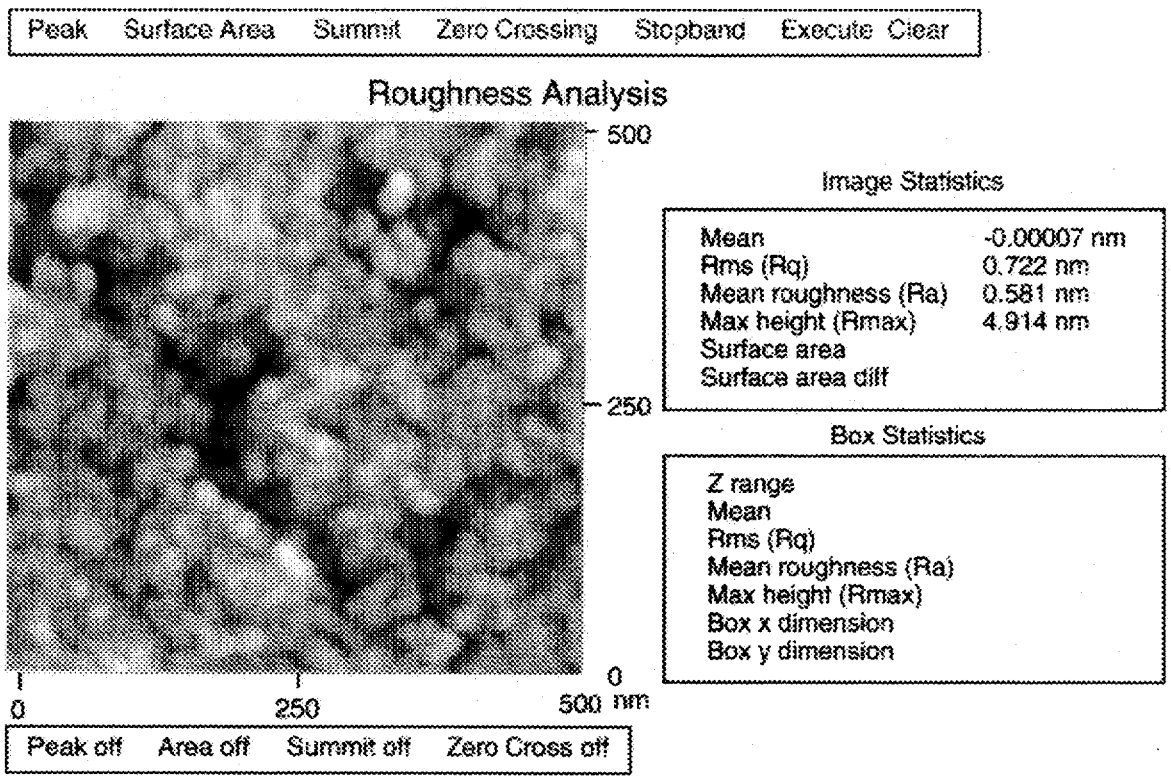

A roughness analysis was done also using an atomic force microscope (AFM). The AFM uses an extremely small sharp tip to scan the sample surface and measures the atomic attraction between the sharp tip and the surface of the sample. The AFM can thereby determine on a very small scale the topology of the sample surface. The white and dark areas of FIGS. 4(a) and (b) represent height differences of the NiAl and Cr underlayer films, respectively, of 100 nm thickness. The images clearly show that the grains (diameter of bumps) of the NiAl films, FIG. 4(a) are much smaller and more uniform than are the Cr grains, FIG. 4(b). Small and uniform grains implies lower noise if everything else about the media is equal. The roughness is a measure of the vertical height variations as one scans over the sample surface. The root mean square (RMS) and mean (average) roughness (Ra) are two different ways of calculating the roughness from the same data. While the maximum height (Rmax) can be misleading if there is a bad spot on the sample, it is a good indication of the extremes (lack of uniformity) of the roughness if the sample is good. The roughness difference between the NiAl and the Cr is another indication of the larger variation in the Cr grain size. The image statistics for the NiAl film show an RMS roughness of 0.372 nm, a mean roughness (Ra) of 0.296 nm and a maximum height (Rmax) of 2.798 nm. The Cr film shows RMS roughness of 0.722 nm, a mean roughness (Ra) of 0.581 nm and a maximum height (Rmax) of 4.914 nm. Clearly, the Cr underlayer has both larger grains and is considerably rougher than the NiAl film.

Figure 5:
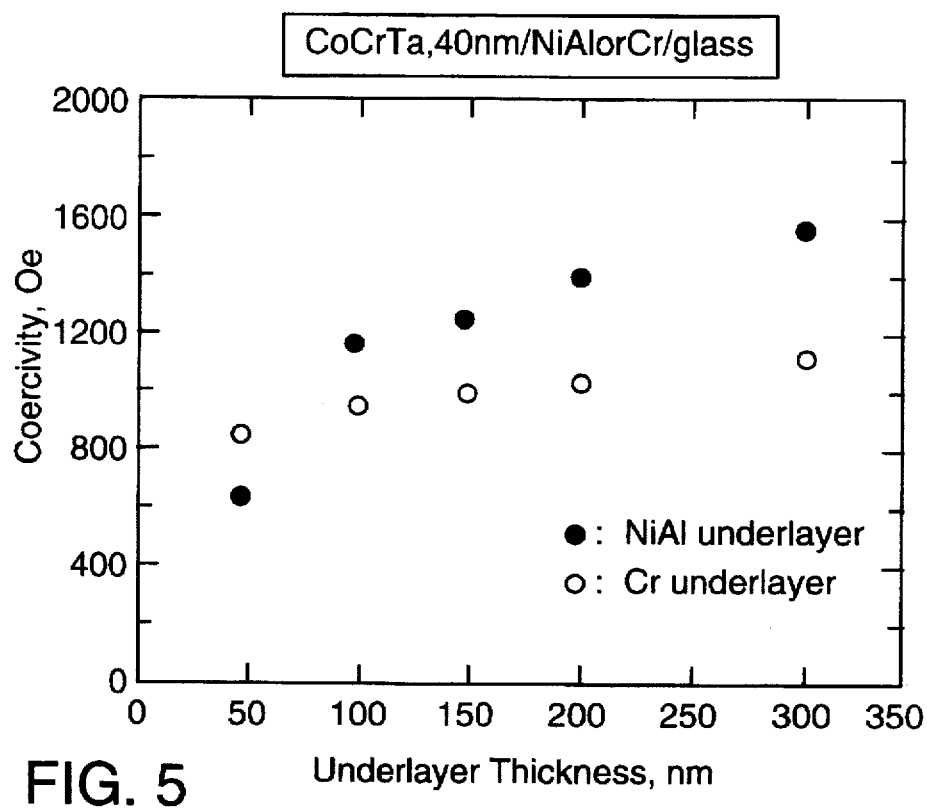
FIG. 5 is a plot of coercivity vs. underlayer thickness of a 40 nm thick CoCrTa film sputter deposited without substrate bias on either NiAl or Cr underlayers.

As shown in FIG. 5, 40 nm thick CoCrTa films were deposited onto NiAl and Cr underlayers of various thickness on glass substrates. The in-plane coercivities of the magnetic films were plotted as a function of the underlayer thickness. When the underlayer is greater than 100 nm thick, the CoCrTa/NiAl films have a higher coercivity, Hc, than the CoCrTa/Cr films for comparable thicknesses. In both cases, the coercivity increases and then reaches a plateau as the underlayer thickens. The steady increase is indicative of larger grains. As indicated previously, larger grains also cause increased noise. With a Cr underlayer, the increased grain size causes a much rougher surface which interferes with the ability of the magnetic head, or transducer, to get close to and read the disk. In practice, due to increased manufacturing costs, the underlayer is not made any thicker than it has to be to get the desired improvement in coercivity. At thicknesses about equal to and greater than 100 nm, the recording medium having the NiAl underlayer offers greater coercivity at thicknesses equal to or even slightly less than those of a recording medium having a Cr underlayer. At a thickness of 100 nm, the NiAl underlayer offers comparable coercivities and smaller grains than the recording media having a Cr underlayer.

Figure 6:
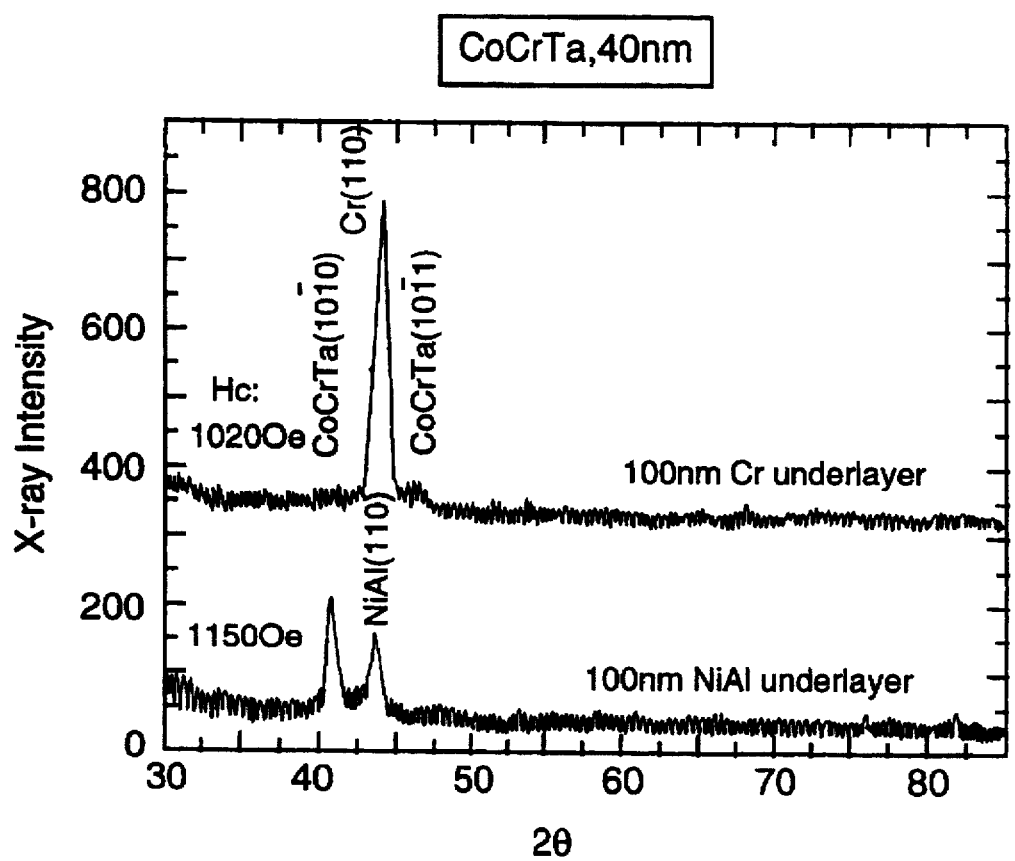
FIG. 6 shows the coercivity value and the x-ray diffraction spectra of CoCrTa/Cr and CoCrTa/NiAl films on glass substrates, where the CoCrTa layers are 40 nm thick and the Cr and NiAl underlayers are 100 nm thick.

In addition, the recording medium has a better in-plane c-axis film crystallographic texture when NiAl is used as the underlayer than it does when Cr is the underlayer. The NiAl film has its {110} and {112} planes preferentially oriented parallel to the film plane. This is supported by X-ray diffraction studies which show that the CoCrTa film on the NiAl underlayer has a larger $(10\bar{1}0)_{C_o}$ peak than the CoCrTa film on a Cr underlayer. FIG. 6 provides a comparison of x-ray diffraction spectra of the CoCrTa/NiAl and CoCrTa/Cr films with their Hc values marked on each curve. The NiAl spectrum has a much stronger HCP Co $(10\bar{1}0)$ peak adjacent the NiAl (110) peak which is believed to reflect a (112) NiAl texture which is weak or not present at all in the Cr underlayer.

Figure 7:
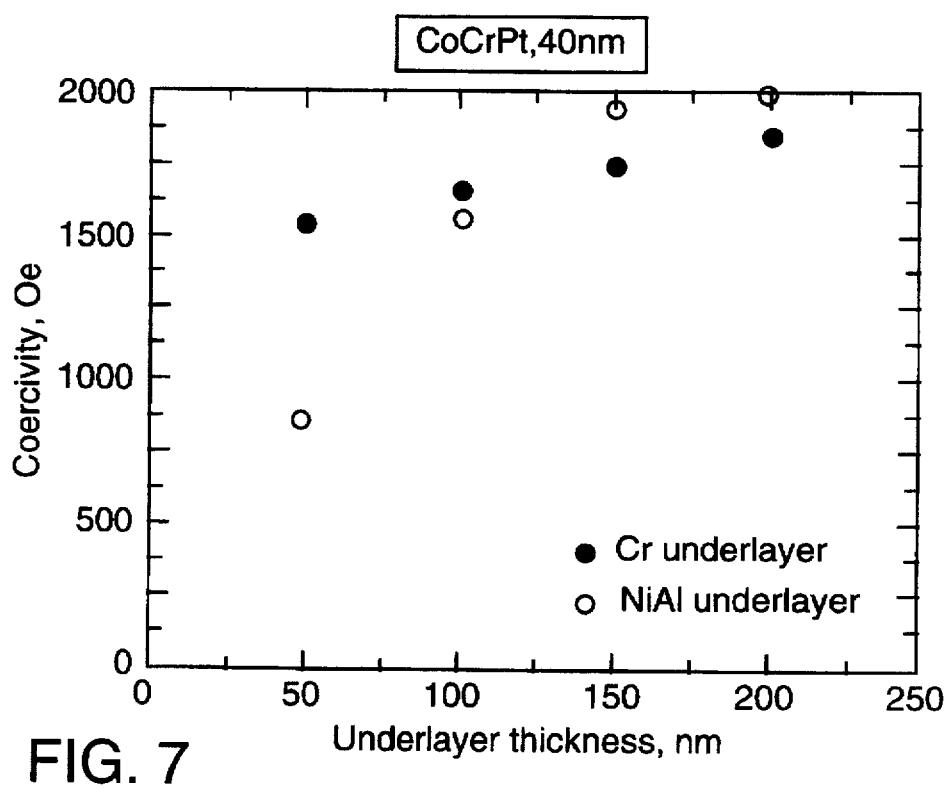
FIG. 7 plots the coercivity of a 40 nm thick CoCrPt film as a function of underlayer thickness for NiAl and Cr underlayers.
Figure 8:
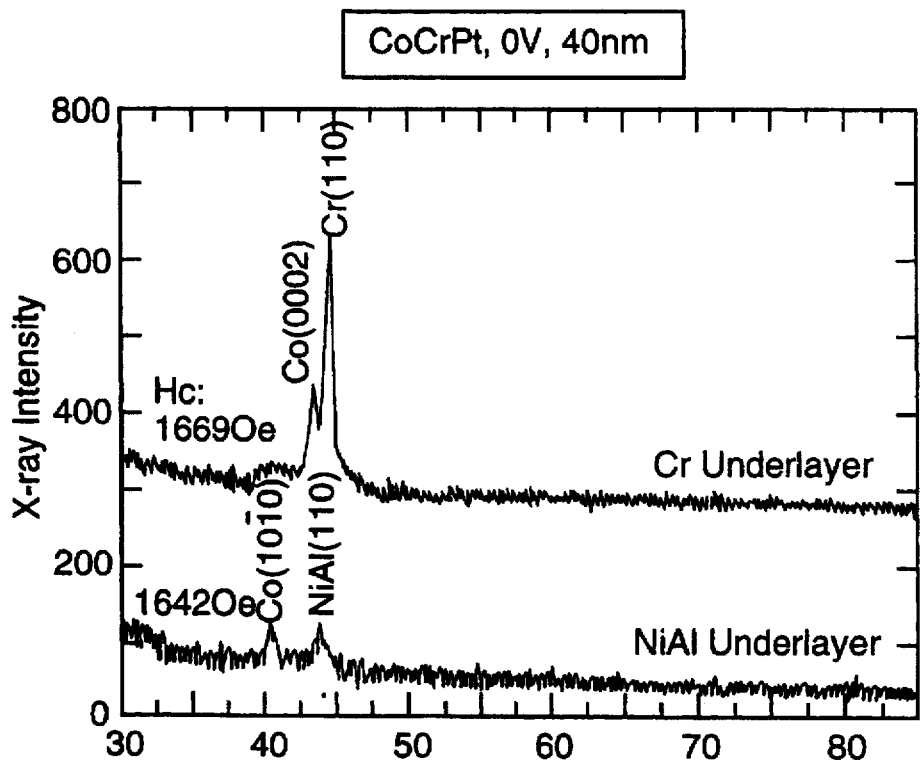
FIG. 8 shows the coercivity value and the x-ray diffraction spectra of CoCrPt/Cr and CoCrPt/NiAl films on glass substrates, where the CoCrPt layers are 40 nm thick and all the underlayers are 100 nm thick.
Figure 11:
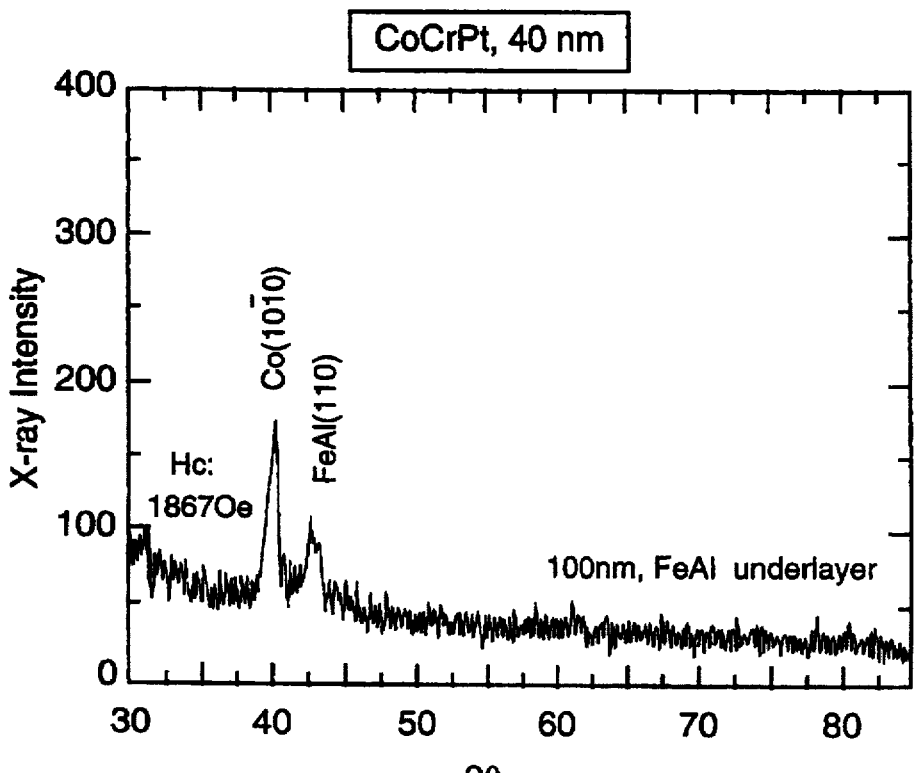
FIG. 11 shows the coercivity value and the x-ray diffraction spectrum of a 40 nm thick CoCrPt film on a 100 nm thick FeAl underlayer on glass substrate.

Similar studies were performed for CoCrPt films. The in-plane coercivity of a 40 nm CoCrPt film is plotted in FIG. 7 as a function of underlayer thickness for NiAl and Cr underlayers. It shows that for a thicker underlayer, the CoCrPt/NiAl film has a higher coercivity than the CoCrPt/Cr film. FIG. 8 is the x-ray diffraction spectra of CoCrPt/NiAl and CoCrPt/Cr films which show that the CoCrPt film on the NiAl underlayer has a stronger $(10\bar{1}0)_{C_o}$ peak than does the same film on Cr underlayer, which again is an indication of a better in-plane c-axis film crystallographic texture. FIG. 11 demonstrates that another phase with the B2-structure, FeAl, also produces a strong $(10\bar{1}0)_{C_o}$ peak. Pt is added to Co alloys to improve coercivity, but at a 15–20% Pt content, the magnetic layer does not lattice match well with the Cr underlayer. The addition of the larger Pt atom to the Co alloy is believed to expand the atomic spacing so that there is no longer a good lattice match with the Cr underlayer. FIG. 8 also shows a $(0002)_{C_o}$ peak, which reflects a poor epitaxial growth to the Cr underlayer. This phenomenon does not appear to take place when the NiAl is used as the underlayer. The NiAl and FeAl spectra reveal a strong $(10\bar{1}0)_{C_o}$ peak and the absence of the (0002) peak, which is indicative of a good longitudinal structure.

NiAl has not been heretofore used as an underlayer for thin film longitudinal magnetic recording media. The sputter deposited NiAl films have small grain size and enhance the Co alloy films' {10$\bar{1}$0} texture. The underlayers of the present invention enhance the in plane c-axis orientation and therefore improve the magnetic properties of the thin film disk with a glass substrate. Similar improvements can be found when other substrates, such as aluminum alloy substrates coated with NiP or silicon substrates are used. Similar results on alternative hard disk substrates such as canasite, or SiC should be obtained also. The underlayer of the present invention may be used as the underlayer for other Co alloy thin films, such as CoCr, SmCo, CoP, CoPt, CoNiCr, CoNiPt, CoCrTaSi, CoCrPtSi, CoCrPtB, and CoCrPtTa.

Figure 9:
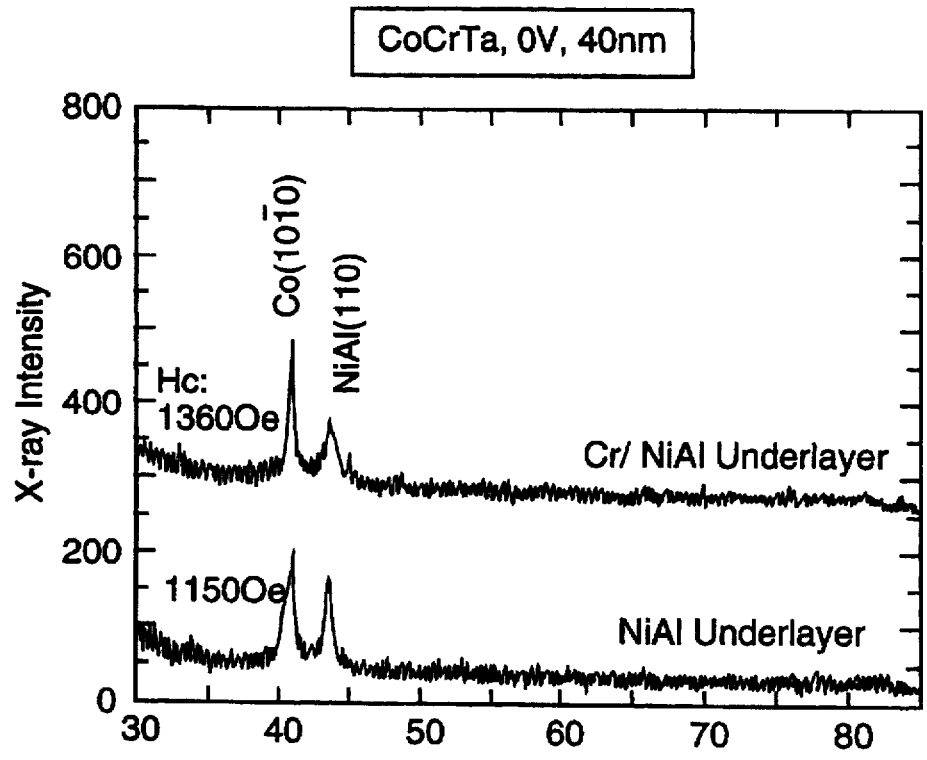
FIG. 9 shows the coercivity value and the x-ray diffraction spectra of a CoCrTa/NiAl film with and without a 2.5 nm thick Cr intermediate layer between the CoCrTa layer and the NiAl layer.

Further improvement in the magnetic properties of the Co alloy thin films on NiAl underlayers can be attained if an intermediate layer of Cr or Cr alloy is inserted between the Co alloy thin film and the NiAl underlayer. Furthermore, the underlying NiAl texture is transmitted to the intermediate Cr layer. FIG. 9 shows the x-ray spectra of a CoCrTa/NiAl film with and without a 2.5 nm Cr intermediate layer between the CoCrTa layer and the NiAl layers. From FIG. 9 it is apparent that when a very thin layer of Cr is placed between NiAl and CoCrTa, the high quality texture of the Co ($10\bar{1}0$) is maintained and the coercivity is improved. It has been found that an intermediate layer 22 of Cr having a thickness less than about 1.0 nm does not form a continuous layer. A substantially continuous layer is apparently needed to give consistent results. At 1.0 nm to 5.0 nm thickness and above, however, the improved coercivity is marked and consistent. Thicknesses above 5.0 nm continue to provide good coercivity, but produce no significant improvement. The combination of a CoCrPt magnetic layer, a NiAl underlayer and a very thin (about 2.5 nm) Cr intermediate layer disposed between the magnetic layer and the underlayer increases the coercivity even more significantly, by 450 Oe. If the cobalt alloy magnetic layer has only the 2.5 nm thick Cr layer without the NiAl underlayer, the Co layer tends to remain either face centered cubic (FCC) or orients [0001] perpendicular to the plane of the film.

Figure 10:
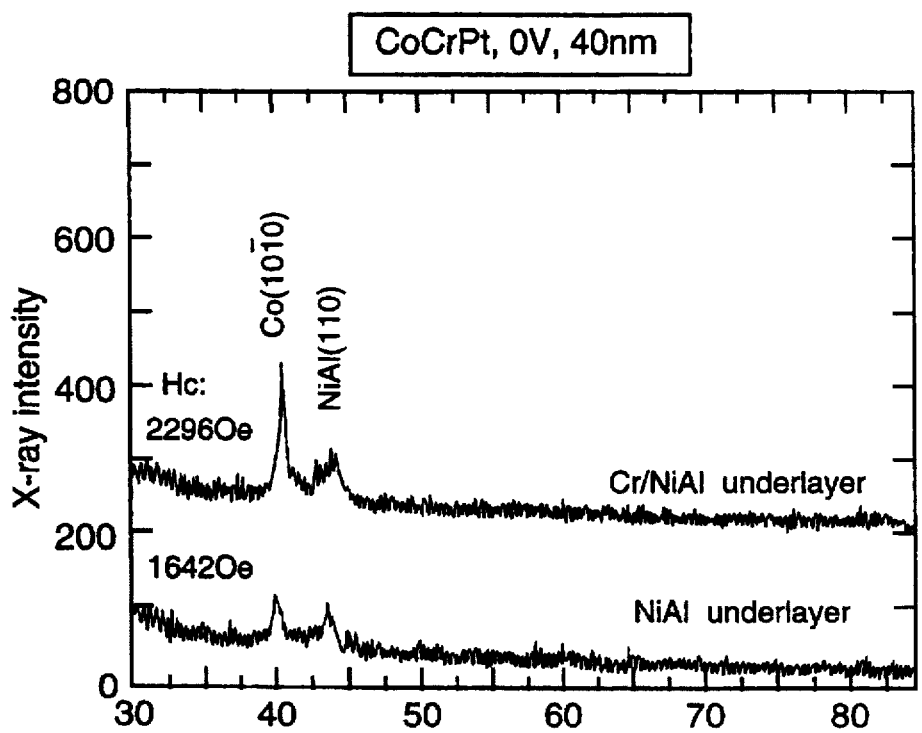
FIG. 10 shows the coercivity value and the x-ray diffraction spectra of a CoCrPt/NiAl film with and without a 2.5 nm thick Cr intermediate layer between the CoCrPt layer and the NiAl layer.
Figure 12:
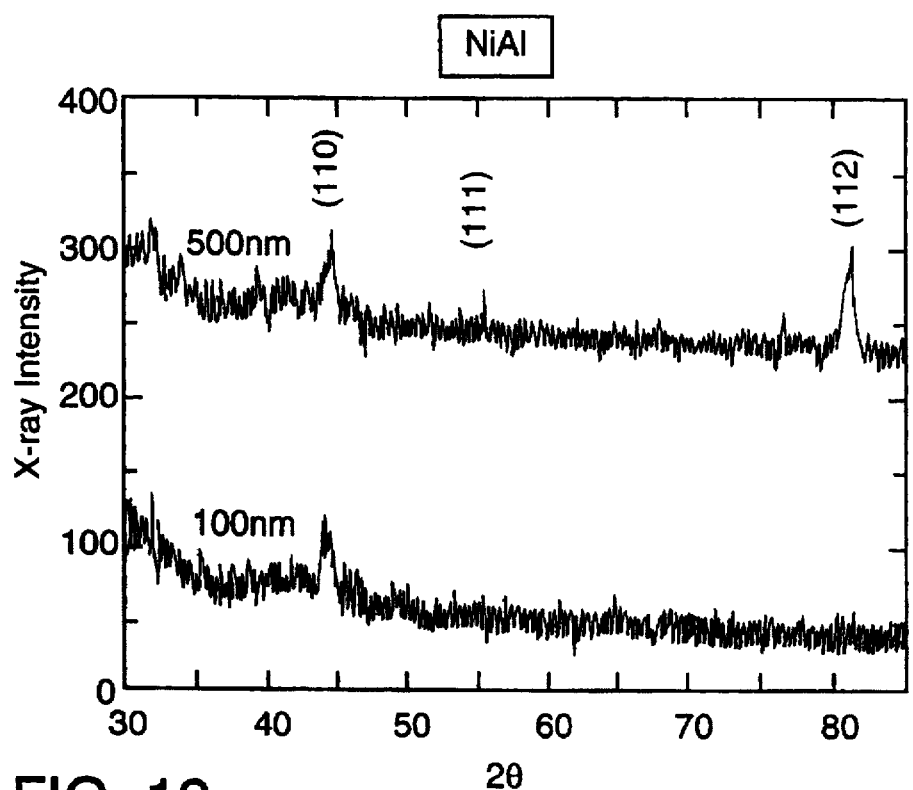
FIG. 12 shows the x-ray diffraction spectra of NiAl films of 100 nm and 500 nm thickness on glass substrates.
Figure 13:
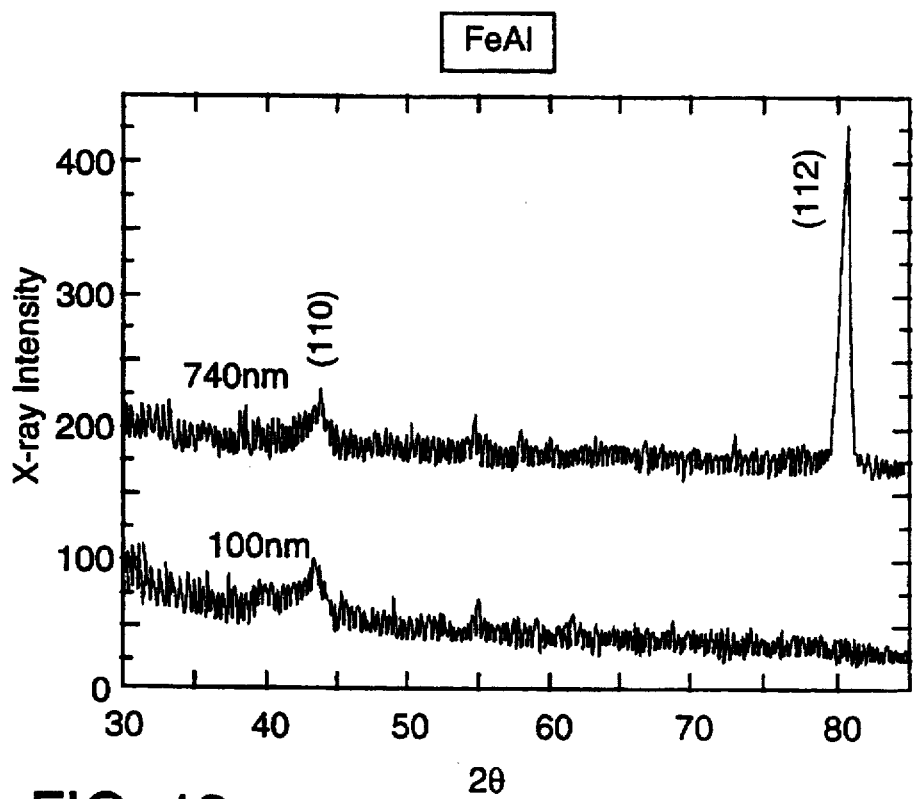
FIG. 13 shows the x-ray diffraction spectra of FeAl films of 100 nm and 740 nm thickness on glass substrates.

FIG. 10 shows the x-ray spectra of a CoCrPt/NiAl film with and without a 2.5 nm Cr intermediate layer between the CoCrPt layer and the NiAl layer. The increase in coercivity is even more dramatic than the increase shown in FIG. 9 using a CoCrTa magnetic layer. The lattice constant of the cobalt HCP structure is significantly increased when the larger Pt atom is substituted for Co. Hence a poorer lattice match between the CoCrPt and the underlayer results. This is obvious in FIG. 8 where CoCrPt on Cr showed no Co ($10\bar{1}0$) peak at all. This peak does occur for the NiAl underlayer, however. It is believed that the difference can be attributed to the ability of NiAl to form a better (112) texture than Cr. Although it is not visible on the x-ray diffraction patterns, this peak should show up at $2\theta=81.86$ degree. Thicker films show this peak as shown in FIGS. 12 and 13 for the NiAl and FeAl underlayers. The (112) texture represents a good lattice match to the Co ($10\bar{1}0$) texture. Furthermore, by comparing FIGS. 8 and 10, the dramatic difference between CoCrPt on a Cr underlayer (no ($10\bar{1}0$) peak and a lower coercivity) and CoCrPt on NiAl with a thin intermediate layer is apparent.

Figure 14:
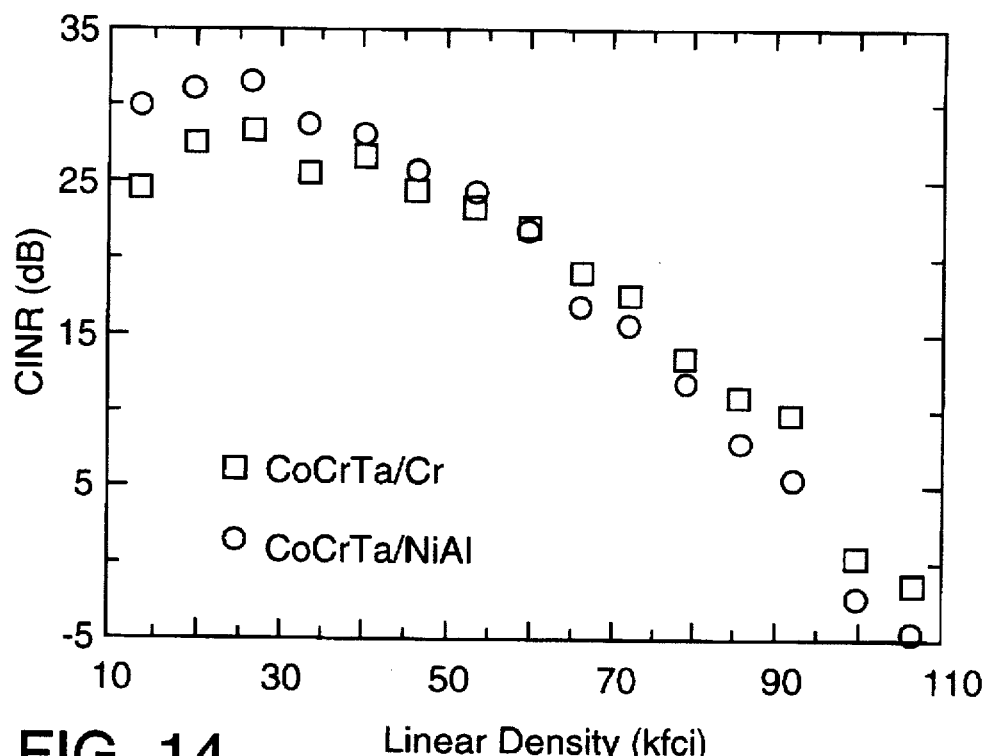
FIG. 14 plots carrier to total integrated noise ratio (CINR) as a function of the linear density for two disks, CoCrTa/Cr and CoCrTa/NiAl, with bias sputtered magnetic layers and unbiased sputtered underlayers.

Tests were done to compare the carrier to total integrated noise ratio (CINR) as a function of the linear recording density, measured in kilo flux changes per inch (KFCI) for two disks. Procedures for taking total integrated noise data are well known to those skilled in the art. See, for example, Belk et al., "Measurement of intrinsic signal-to-noise ratio for high-performance rigid recording media," Journal of Applied Physics, Vol. 59, No. 2, p. 557 (15 Jan. 1986). The results are plotted in FIG. 14. The underlayers were sputter deposited on a glass substrate without bias and the magnetic layer was sputter deposited with bias, i.e. with an applied voltage to the surface. The disk represented by squares was CoCrTa/Cr having a coercivity of 1700 Oe. The disk represented by circles was CoCrTa/NiAl having a coercivity of 1400 Oe. The disks having NiAl as the underlayer were determined to behave comparably to the disks having Cr as the underlayer, but the coercivities were somewhat lower in this sample for NiAl films when the magnetic layer is deposited with bias. The noise levels were also somewhat lower.

Figure 15:
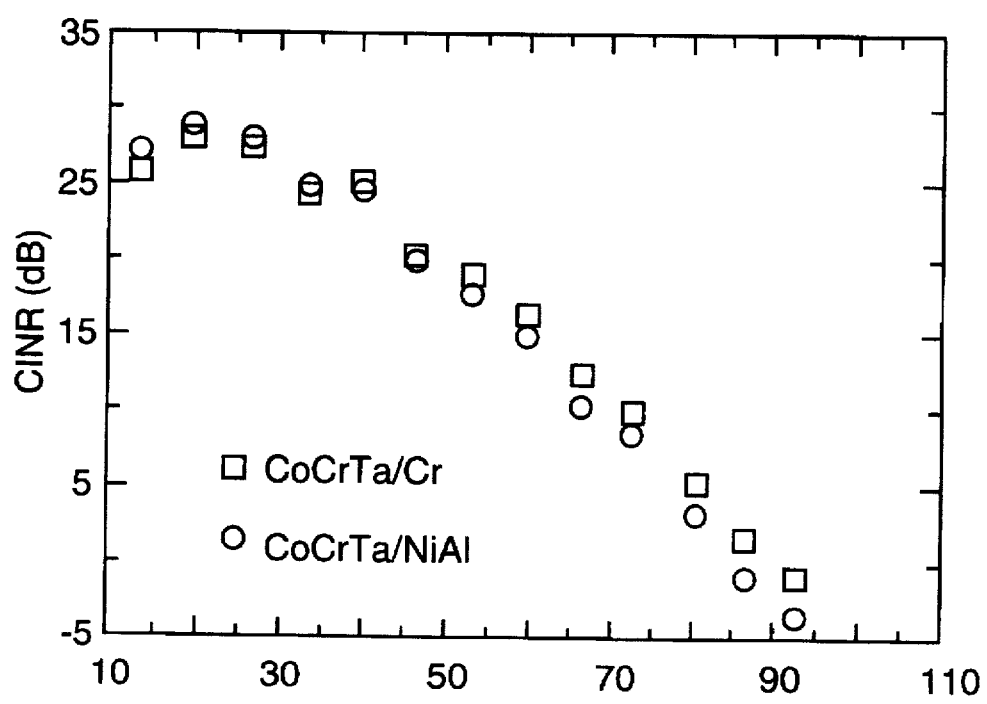
FIG. 15 plots the carrier to total integrated noise ratio (CINR) as a function of linear density for two disks, CoCrTa/Cr and CoCrTa/NiAl, with unbiased sputtered magnetic and underlayers.

In order to compare recordings on media with similar coercivities but different underlayers, disks were sputtered without bias. Tests were done to compare the carrier to total integrated noise (CINR) between the two disks. The results are shown in FIG. 15. The disk represented by the squares had a CoCrTa magnetic layer on a Cr underlayer and a coercivity of 1000 Oe. The disk represented by circles had a CoCrTa magnetic layer and a NiAl underlayer and a coercivity of 1150 Oe. Again, the behavior of the two disks was comparable with the NiAl disk showing lower noise somewhat.

Figure 16:
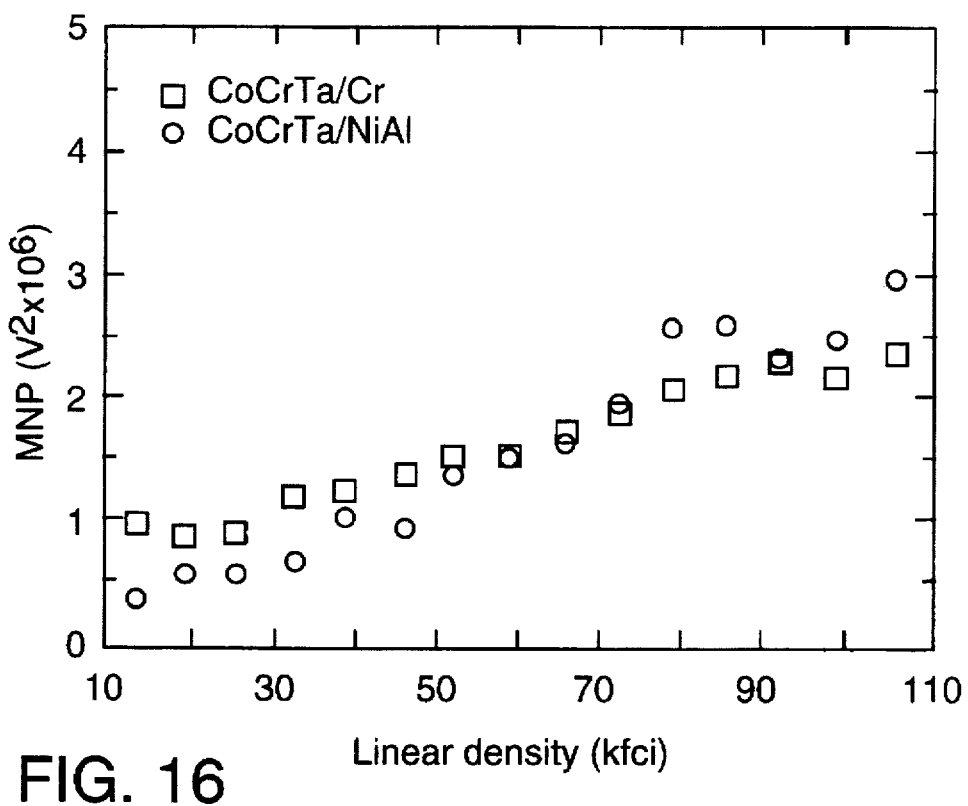
FIG. 16 plots the total medium integrated noise power (MNP) as a function of linear density for the two disks of FIG. 14.
Figure 17:
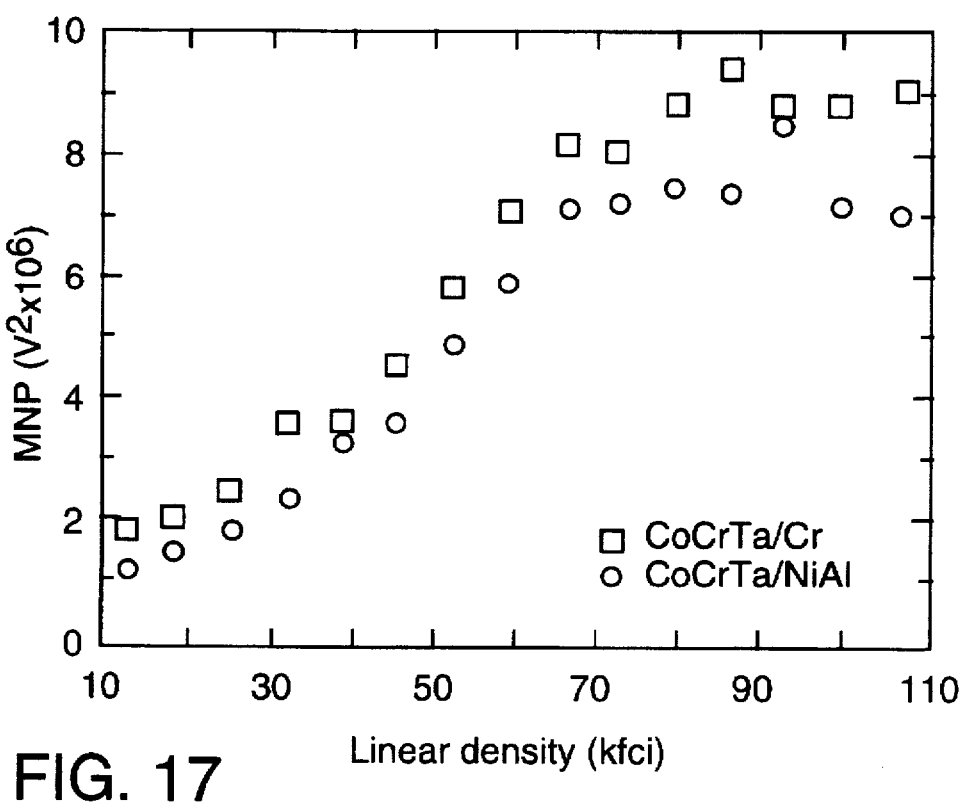
FIG. 17 plots the total medium integrated noise power (MNP) as a function of linear density for the two disks of FIG. 15.

FIG. 16 plots the medium integrated noise power (MNP) as a function of linear density. The MNP represents the total integrated noise power divided by the voltage pulse one would obtain if the signal were recorded at low frequencies (i.e., the isolated pulse height). FIG. 16 shows the results for the disks of FIG. 14. FIG. 17 plots the MNP as a function of linear density for the disks of FIG. 15. The results for the disks in FIGS. 16 and 17 are comparable, with lower noise for the disk having the NiAl underlayer, particularly when the magnetic layer are not deposited with bias. The results demonstrate that the disposition of the NiAl underlayer between the substrate and the magnetic layer is at least as valuable, if not more so, to the enhanced behavior of the recording media than the similar disposition of a Cr underlayer. It is anticipated that thin film longitudinal magnetic recording media having NiAl underlayers, or other B2 ordered structures as underlayers, will, with minor optimization, perform even better than the comparable products with Cr underlayers.

In the embodiment of the invention wherein the magnetic recording media has a seed layer sputter deposited on the substrate beneath the underlayer, it has been found that thin layers of MgO with a B1- ordered crystalline structure and (002) film texture improve the texture and magnetic properties of the Co and Co alloy thin films. The MgO seed layer may be used to enhance the texture of underlayers comprised of either the A2 structure, such as Cr, or the B2-ordered structures, such as NiAl, AlCo, FeAl, FeTi, CoFe, CoTi, CoHf, CoZr, NiTi, CuBe, CuZn, AlMn, AlRe, AgMg and $Al_2FeMn_2$.

MgO is an ionic crystal which has the B1 (NaCl-type) crystal structure with a lattice constant of 0.421 nm (FIG. 18). It has excellent high temperature chemical stability. The melting point is nearly 3000° C. The strong (002) textured polycrystalline MgO film with random in-plane orientation provided by this embodiment of the recording media of the invention is of greater practical utility than the MgO single crystal disk substrates studied by M. Futamoto et al., "Magnetic and recording characteristic of bicrystalline longitudinal recording media formed on an MgO single crystal disc substrate", IEEE Transactions on Magnetics, Vol. 30, No. 6, p.3975 (1994).

Experiments were conducted using a MgO seed layer sputter deposited on the substrate. All films tested in this series of experiments were RF diode sputter deposited in a Leybold-Heraeus Z-400 system on 1 inch square Corning 7059 glass substrates without preheating. Depositions were performed at a fixed AC power of 2.3 W/cm$^2$ with a 10 mTorr Ar gas sputtering pressure. EDX analysis of the magnetic CoCrPt film determined the composition to be 72 at % Co, 10 at % Cr,and 18 at % Pt. All the CoCrPt films reported were maintained at a constant thickness of 40 nm by controlling the pre-calibrated deposition time. The films' thicknesses were also crosschecked with a Tencor profilometer. Surface morphology of the films were checked by atomic force microscopy and the bulk magnetic properties were measured by vibrating sample magnetometry. Crystallographic textures were studied by x-ray diffractometry with CuK$_\alpha$ radiation.

It has been found that the sputter-deposited MgO films easily grow to have the (002) film texture. It is believed that the (002) preferential orientation is because the closest packed (002) plane has the lowest surface energy. When 20 nm thick MgO seed layers are deposited prior to the deposition of the Cr or NiAl underlayers, the resulting texture of the underlayers is a strong (002), whether or not the substrate is heated. This is the often sought-after underlayer texture because the (11$\bar{2}$0) textured Co alloy magnetic film layer tends to grow epitaxially on it. The use of sputter deposited MgO seed layers promotes the desired (002) texture in the Cr or NiAl underlayers without resorting to an external substrate heating device.

Figure 19A:
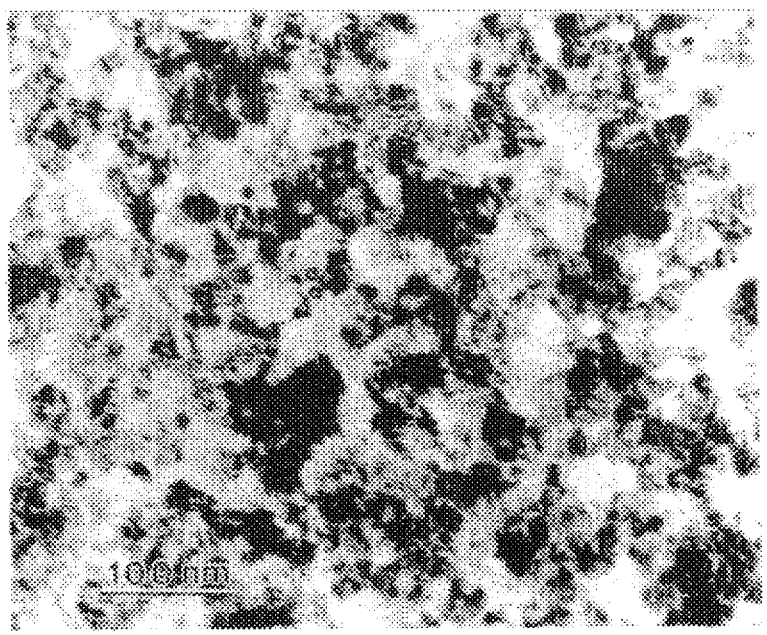
FIG. 19 (a) and (b) show a transmission electron microscopy (TEM) bright field image of a 100 nm thick MgO film on a glass substrate (a) along with its electron diffraction pattern (b)
Figure 19B:
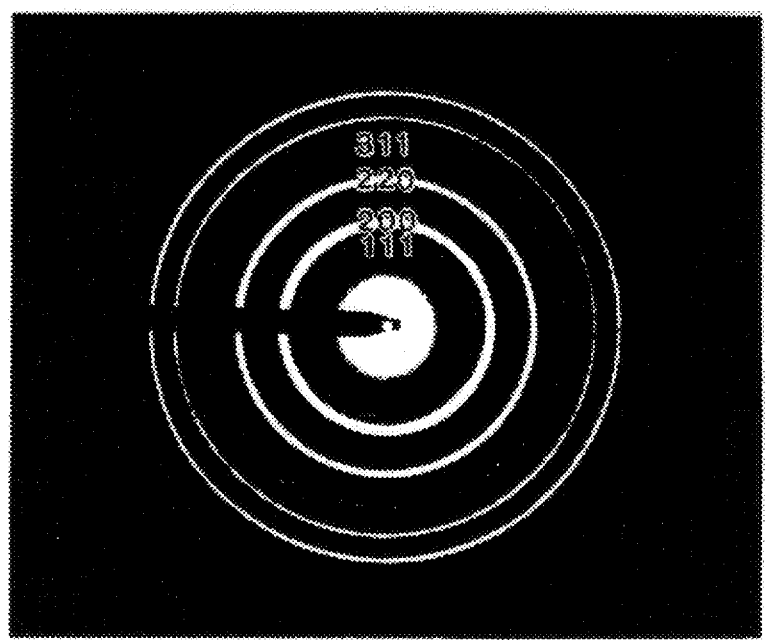

FIG. 19 shows the transmission electron microscopy (TEM) bright field micrograph of a 100 nm thick MgO film and its electron diffraction ring pattern. The ring pattern matches well with the expected diffraction pattern of a B1 polycrystalline material with a lattice constant of 0.423 nm. The grain size is estimated to be about 45 nm.

Figure 20:
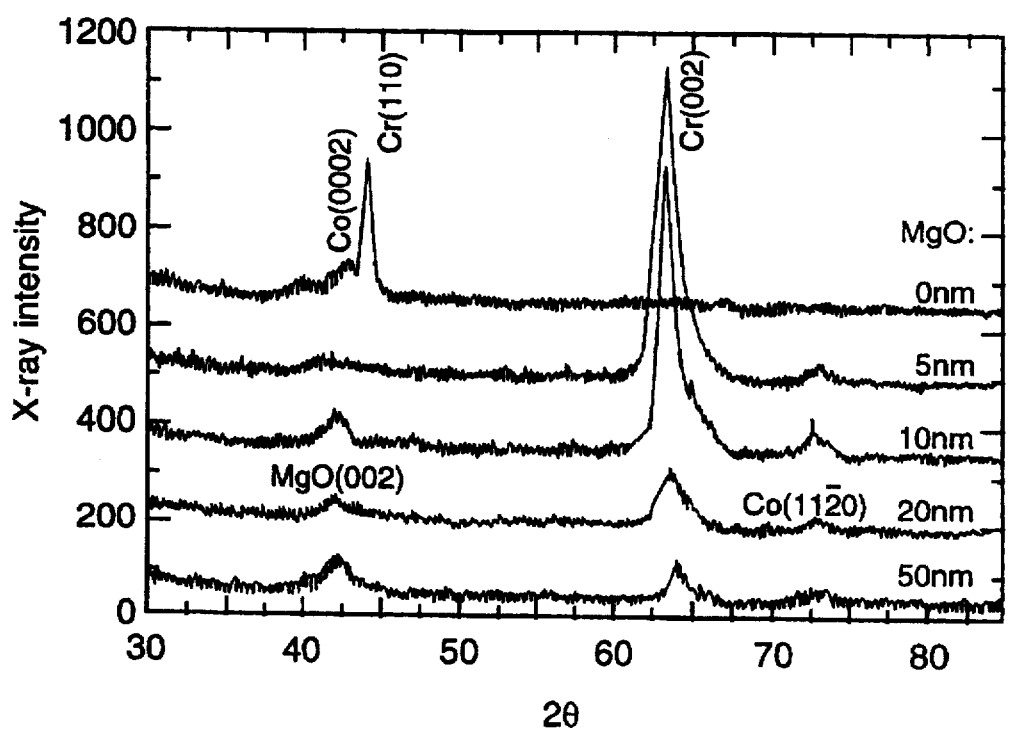
FIG. 20 is an x-ray diffraction spectra of the CoCrPt(40 nm)/Cr(100 nm) films with various thicknesses of MgO seed layers.

FIG. 20 is a plot of the x-ray diffraction spectra of the CoCrPt(40 nm)/Cr(100 nm) films with various thicknesses of MgO seed layers. All film with MgO seed layers show Cr (002) and Co (11$\bar{2}$0) peaks while the film without the seed layer does not have any reflections which indicate that there is in-plane c-axis texture. The visible Co (0002) peak in the diffraction spectrum of the film without a MgO seed layer is a manifestation of the large lattice misfit of Cr (110) to the Co (10$\bar{1}$0) or Co (10$\bar{1}$1) lattice plane or between Cr (002) to the Co (1120) lattice plane. In spite of the poor atomic match of the high Pt content CoCrPt to the pure Cr (0002), the high quality texture of the (002) Cr grown on MgO appears to produce a good surface for epitaxial growth of Co (11$\bar{2}$0). The appearance of Co (11$\bar{2}$0) peak and the suppression of Co (0002) peak due to the MgO seed layer in FIG. 20 are important to achieving high in-plane coercivity.

Figure 26:
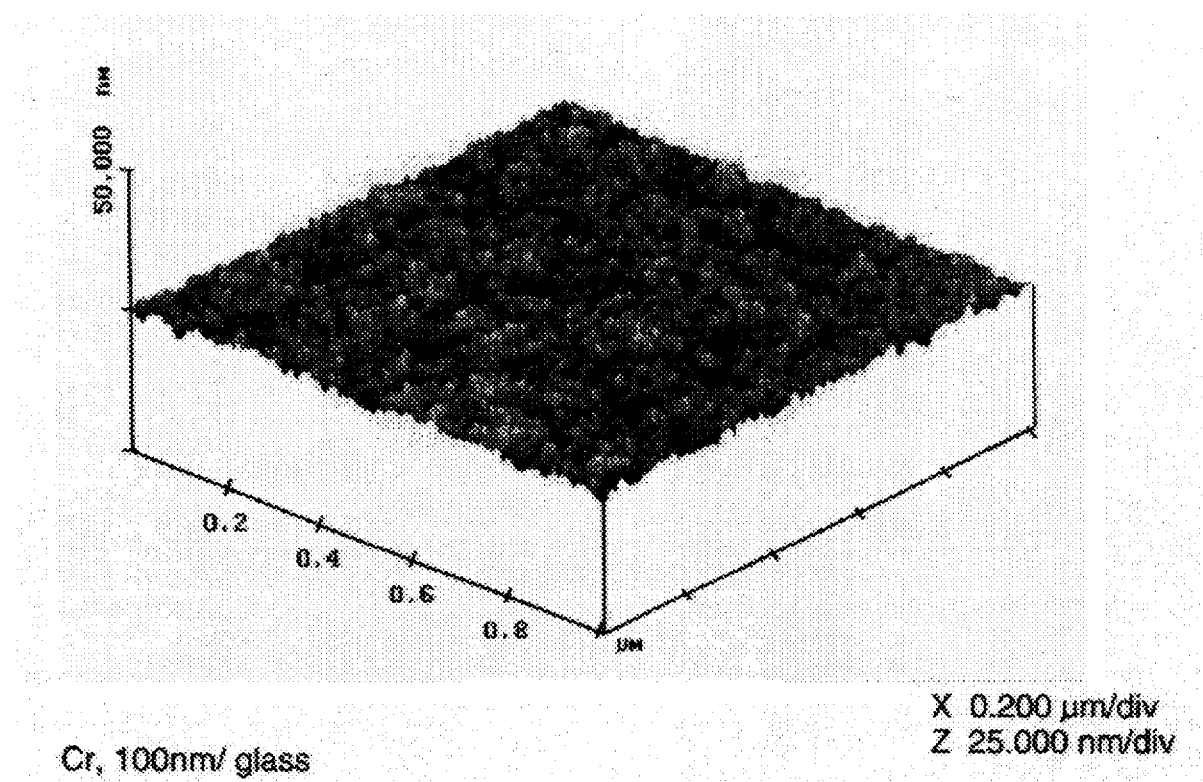
FIG. 26 is an atomic force microscopy (AFM) micrograph of Cr, 100 nm on a glass substrate.
Figure 27:
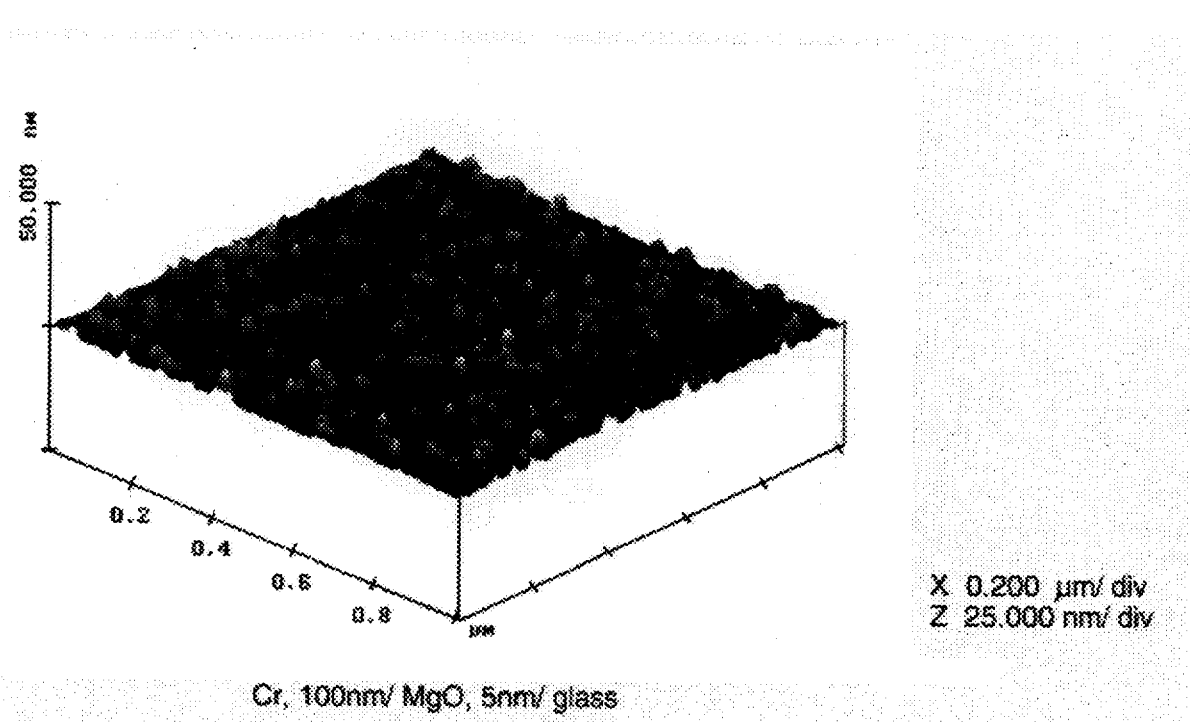
FIG. 27 is an AFM micrograph of Cr, 100 nm on a MgO, 5 nm seed layer on a glass substrate.
Figure 28:
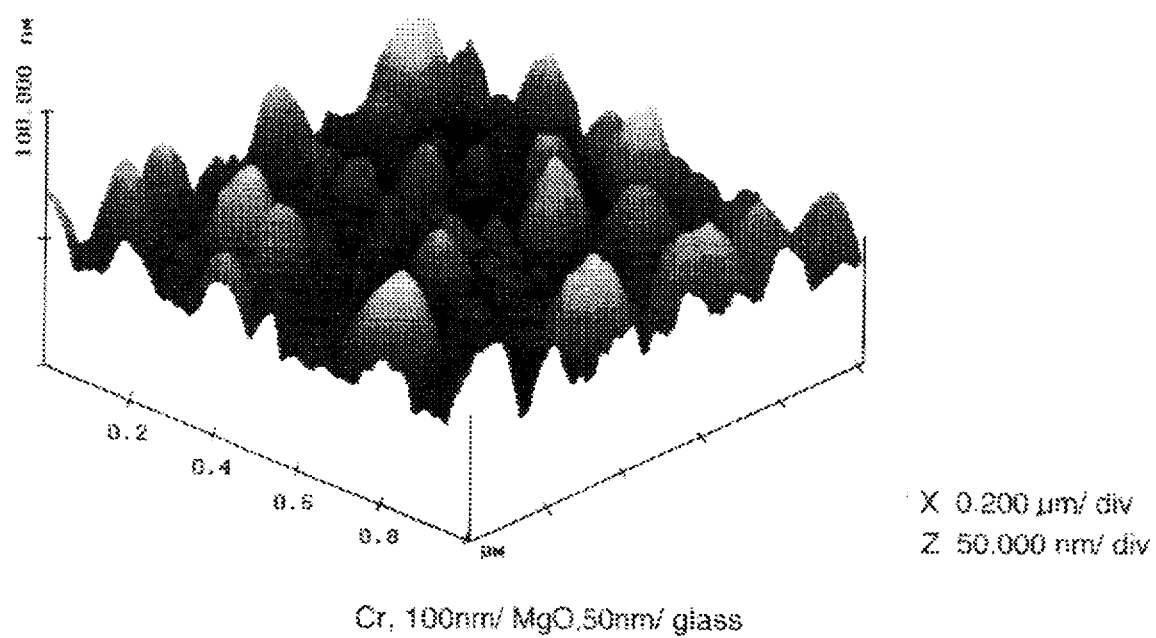
FIG. 28 is an AFM micrograph of Cr, 100 nm on a MgO, 50 nm seed layer on a glass substrate.

In FIG. 20, the intensity of the Cr (002) peak, as well as that of the Co (11$\bar{2}$0), increases as the MgO thickness increases up to 10 nm. However, increase in the MgO thickness to 50 nm has been shown to decrease the intensity of the Cr (002) and Co (11$\bar{2}$0) peaks, perhaps due to overheating of the film during deposition. From atomic force microscopy (AFM) studies, it has been found that the MgO film roughens considerably as its thickness increases. This may result from heat. It is believed that a cooler deposition process would not produce MgO bumps until the film layer is much thicker, if at all. (FIGS. 26, 27, 28) Micro-bumps of up to 40 nm in height and 200 nm in diameter were observed in the 50 nm thick MgO film shown in FIG. 28. Too great an increase in roughness causes the deterioration of the epitaxy of the MgO and Cr. However, magnetic media surface roughness due to MgO bumps of about 50 to about 200 Å are advantageous in preventing the slider heads from sticking to the disc. Currently, disc surfaces are intentionally roughened mechanically with sand paper or by laser texturing to prevent such sticking. The sandpaper method is difficult to control. The MgO seed layer provides a dual use readily controlled roughness texture.

Figure 23:
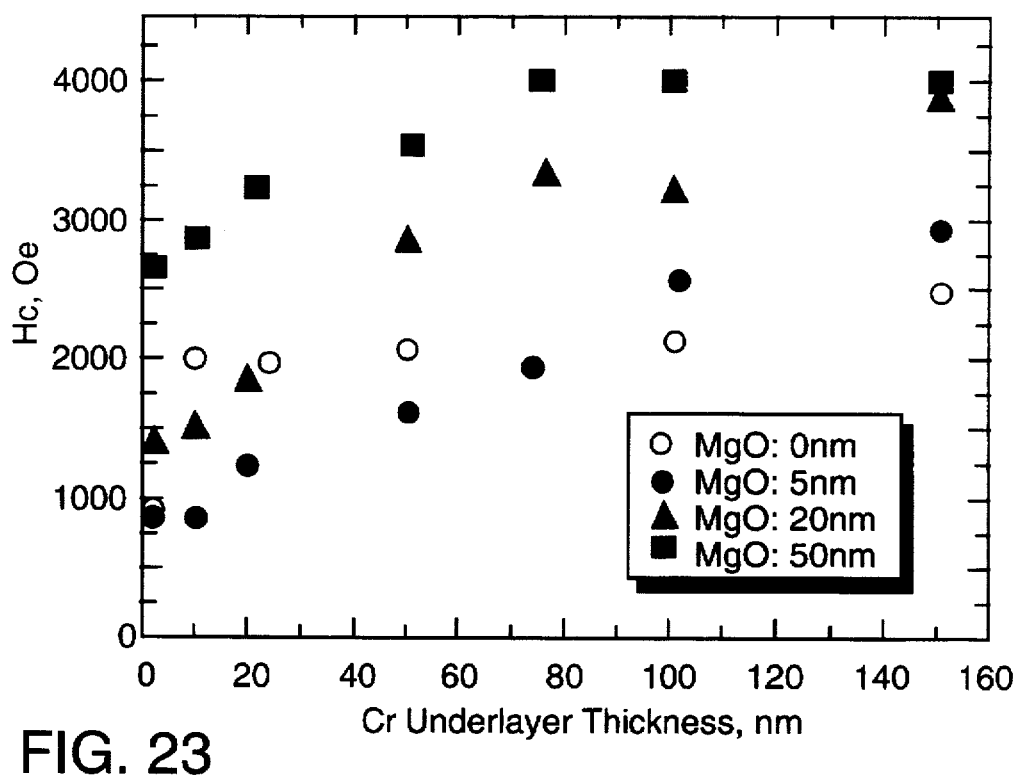
FIG. 23 plots the in-plane coercivity of CoCrPt(40 nm) vs. its Cr underlayer thickness for MgO seed layers of 0 nm, 5 nm, 20 nm and 50 nm thicknesses.

FIG. 23 plots the in-plane coercivity values of the CoCrPt (40 nm)/Cr films of various Cr underlayer thicknesses with and without MgO seed layers on glass substrates. Table I lists a complete set of in-plane magnetic properties of the CoCrPt(40 nm)/Cr(100 nm) films on MgO seed layers of various thicknesses.

TABLE I

The in-plane magnetic properties of the CoCrPt (40 nm)/Cr (100 nm) films on MgO seed layers of various thicknesses.

| MgO thickness | Hc, Oe | S (Mr/Ms) | S* | Mrt, memu/cm$^2$ |
|---|---|---|---|---|
| 0 nm | 2286 | 0.83 | 0.84 | 1.2 |
| 5 nm | 2583 | 0.87 | 0.88 | 1.2 |
| 10 nm | 2608 | 0.86 | 0.91 | 1.2 |
| 20 nm | 3252 | 0.88 | 0.90 | 1.2 |
| 50 nm | 4036 | 0.88 | 0.88 | 1.1 |

It is found that the improvement in coercivity increases as the thickness of the Cr underlayer or the MgO seed layer increases. The coercivity reaches a value as high as 4000 Oe, if a 50 nm thick MgO seed layer is used along with a Cr underlayer thicker than 75 nm. It is known that micro-bumps underneath the Co alloy film can increase the physical separation between the Co alloy grains and therefore increase the coercivity value. On the other hand, decreasing the Co (11$\bar{2}$0) texture which is caused by the increasing roughness of the film would tend to decrease the coercivity.

The continuing increase in Hc as the MgO layer thickens shows the effect of the weakening of the Co (11$\bar{2}$0) texture is more than compensated by the enhancement in isolation of the Co grains. However, the grain size of the CoCrPt film may also be changing because of the MgO seed layers bumps. Larger grain size is known to be a factor which causes the coercivity to increase as long as the grains are single domains. The plane-view TEM images CoCrPt(40 nm)/Cr(100 nm) films on various thicknesses of MgO seed layers are shown in FIG. 25. There is only a slight increase in the grain size of the CoCrPt films. The large dark patches in FIGS. 25 (c) and 25 (d) are shadows of the MgO bumps, not grains.

The multi-layered films in these experiments were made by sputtering one layer after the other without breaking the vacuum of the sputtering system. However, it has been found that glass substrates with presputtered MgO seed layers can still induce good (002) Cr epitaxial growth even though the MgO films have been intentionally exposed to air for more than a month. This may be very convenient for media production where the MgO could be deposited in a separate vacuum system.

Table II lists the VSM measurements of the 40 nm thick CoCrPt films on 100 nm NiAl underlayers on MgO seed layers of various thicknesses.

TABLE II

The in-plane magnetic properties of the CoCrPt (40 nm)/NiAl (100 nm) films on MgO seed layers of various thickness.

| MgO thickness | Hc, Oe | S* | S | Mrt, memu/cm$^2$ |
|---|---|---|---|---|
| 0 nm | 1862 | 0.87 | 0.84 | 1.4 |
| 2 nm | 2558 | 0.92 | 0.86 | 1.1 |
| 5 nm | 2811 | 0.92 | 0.87 | 1.2 |
| 8 nm | 3283 | 0.92 | 0.88 | 1.1 |
| 10 nm | 3238 | 0.91 | 0.87 | 1.0 |
| 20 nm | 3236 | 0.86 | 0.84 | 1.0 |
| 50 nm | 3182 | 0.82 | 0.87 | 1.0 |

Figure 21:
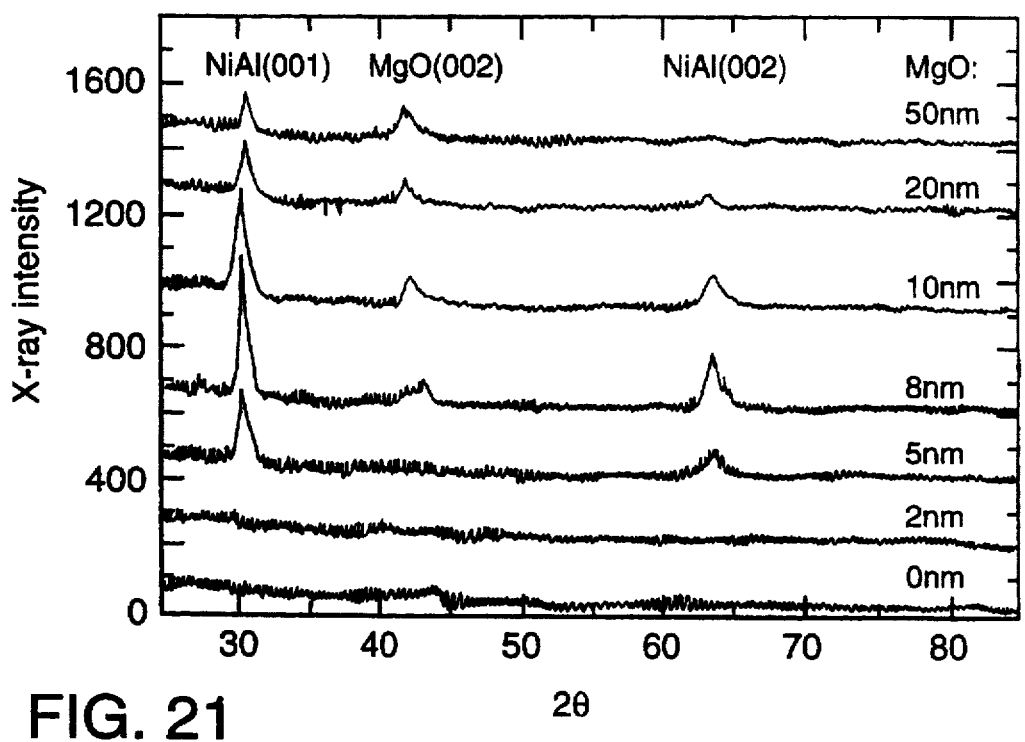
FIG. 21 is an x-ray diffraction spectra of the CoCrPt(40 nm)/NiAl(100 nm) films with no seed layer and on various thicknesses of MgO seed layers.

The coercivity is shown to increase rapidly and then to level off as the MgO seed layer thickens. The crystallographic texture of these 40 nm CoCrPt/100 nm NiAl films on MgO seed layers revealed by x-ray diffraction spectra are plotted in FIG. 21. The (002) MgO peak continuously becomes stronger as the MgO layer thickens. The intensity of the (002) NiAl peak is not proportional to the MgO thickness. The maximum coercivity film in Table II corresponds to the film with the strongest (002) NiAl crystallographic texture.

Figure 30A:
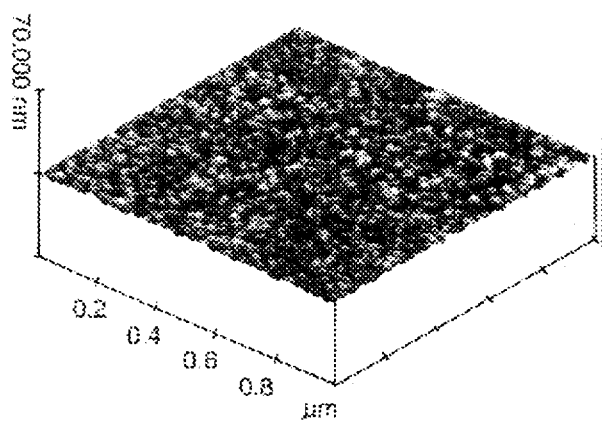
Figure 30B:
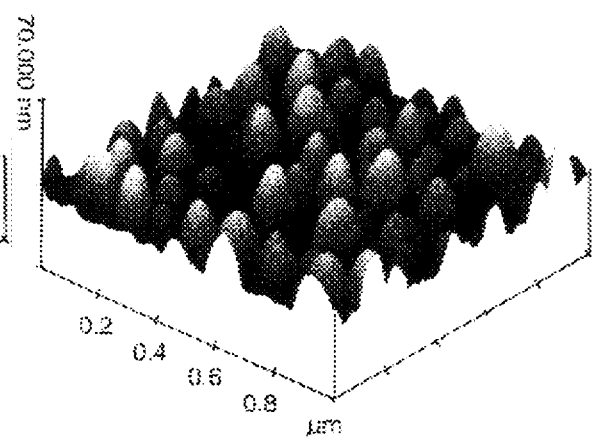

AFM studies of the films showed little increase in surface roughness as the MgO seed layer is increased from 2 nm to 10 nm. However, there is a dramatic increase of the surface roughness as the MgO seed layer reaches 20 nm which, as stated above, is believed to be due to the surface getting hot during the MgO deposition process. Magnetron sputtering would not heat the substrate as much as the method used in the examples, and thus would not produce the bumpy surface. FIG. 30 (a) and (b) show AFM surface topography plots of 100 nm NiAl films on 10 nm and 20 nm MgO seed layers on glass substrates. The plots demonstrate that a 20 nm MgO seed layer can roughen the film considerably to form surface bumps up to about 150 nm in diameter and about 25 nm in height. It is believed that the high density recording media of the future will need a low flying height. Notwithstanding the fact that the surface of the disc substrate is generally roughened by mechanical or chemical texturing to avoid having the transducer head stick to the smooth disc, the roughness of the 20 nm MgO thickness may be problematic for high density recording media. On the other hand, the MgO seed layer can be used to tailor the roughness by controlling the MgO layer thickness, the deposition temperature and the sputtering process.

Figure 24:
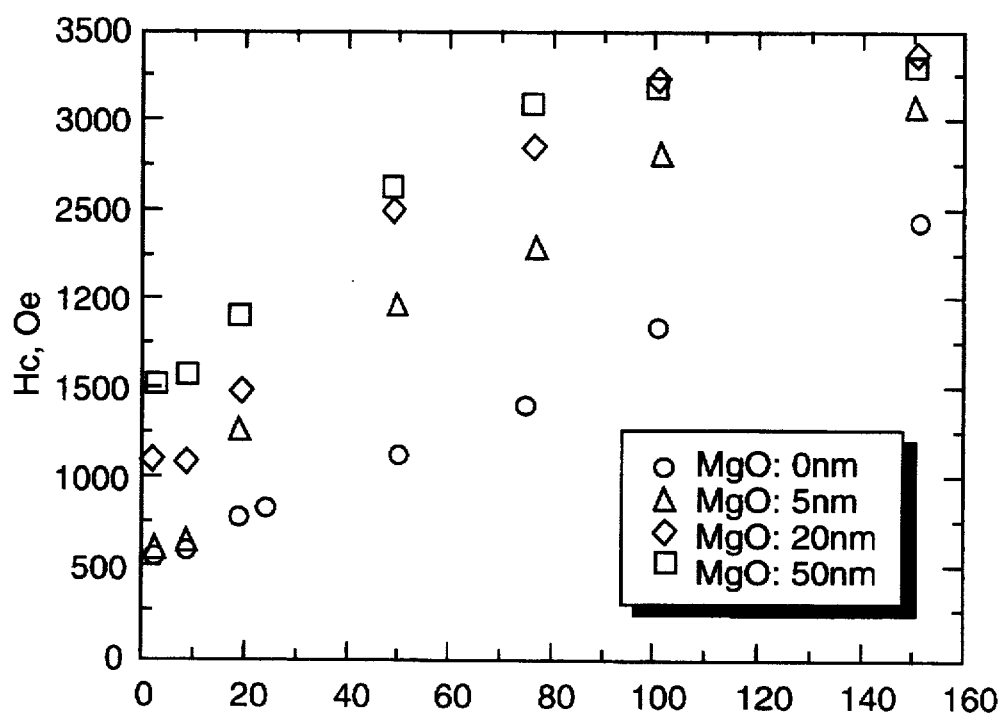
FIG. 24 plots the in-plane coercivity of CoCrPt(40 nm) vs. its NiAl underlayer thickness for MgO seed layers of 0 nm, 5 nm, 20 nm and 50 nm thicknesses.
Figure 25A:
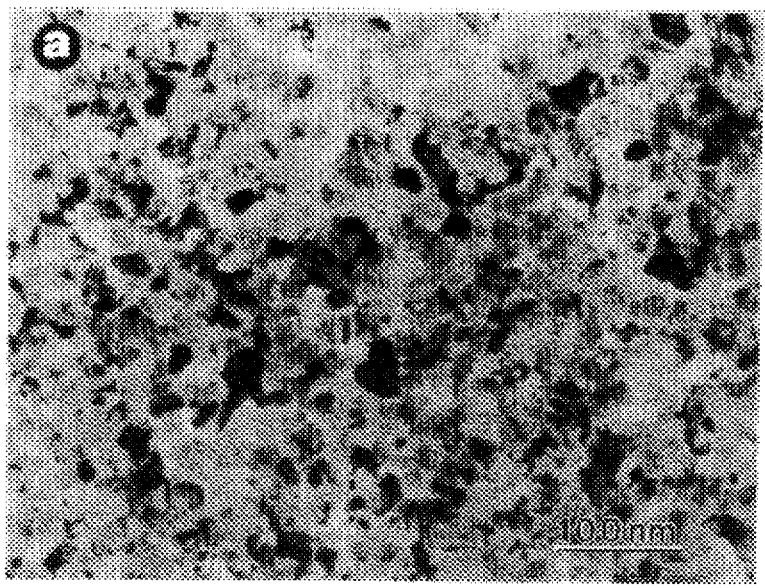
FIG. 25 (a)–(d) show a TEM bright field image of plane-view CoCrPt(40 nm)/Cr(100 nm) films on MgO seed layers of (a) 0 nm (b) 5 nm (c) 20 nm (d) 50 nm thicknesses.
Figure 25B:
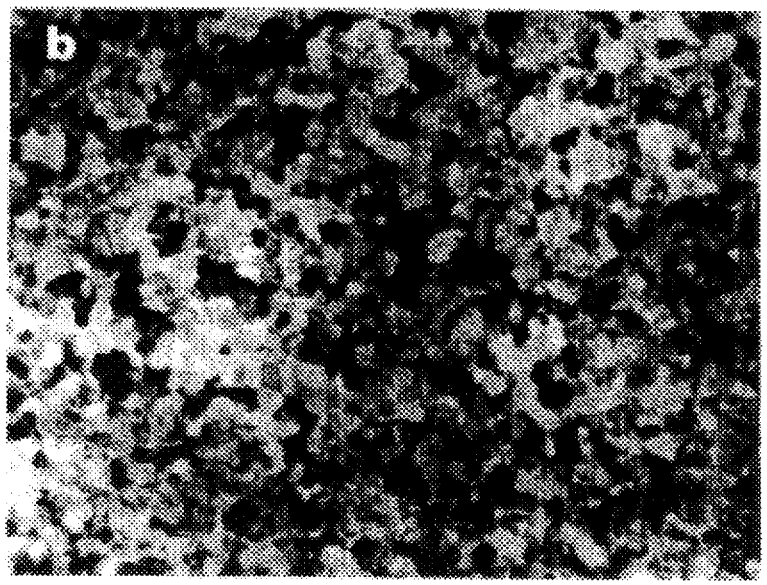
Figure 25C:
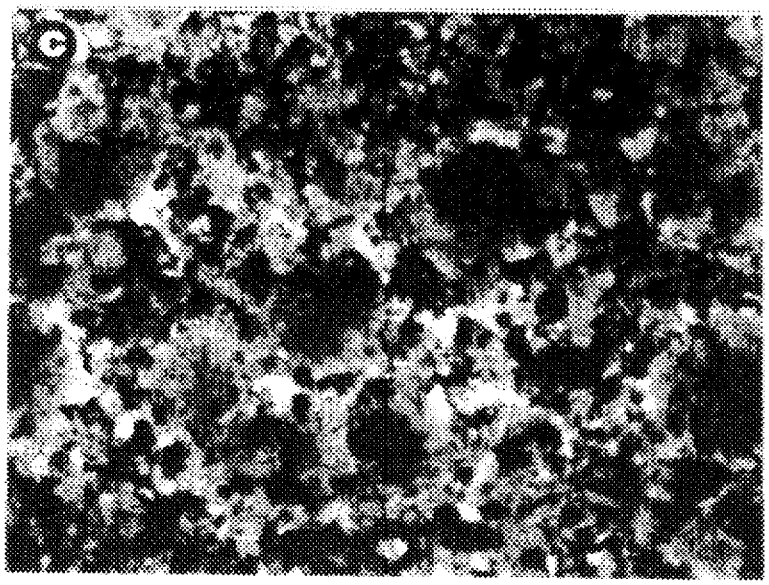
Figure 25D:
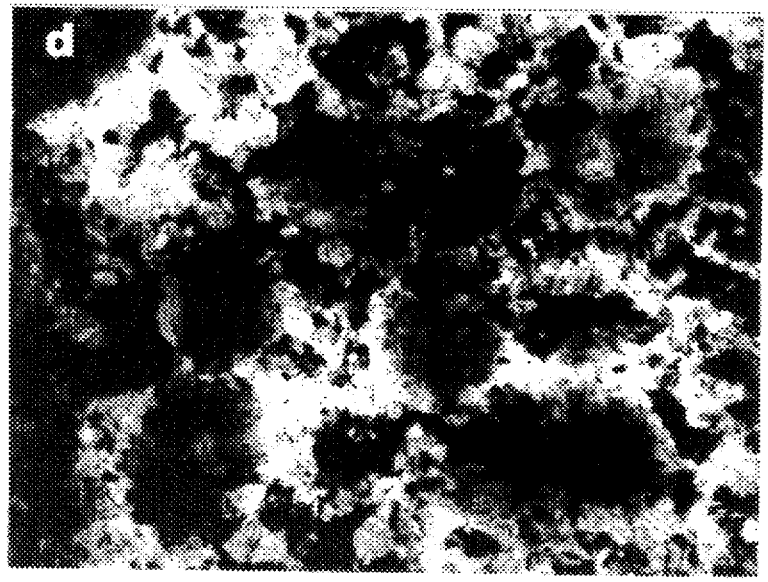

FIG. 24 is a plot of four sets of coercivity data of the 40 nm thick CoCrPt films with varying NiAl underlayer thicknesses for MgO seed layer thicknesses of 0 nm, 5 nm, 20 nm and 50 nm.

Figure 22:
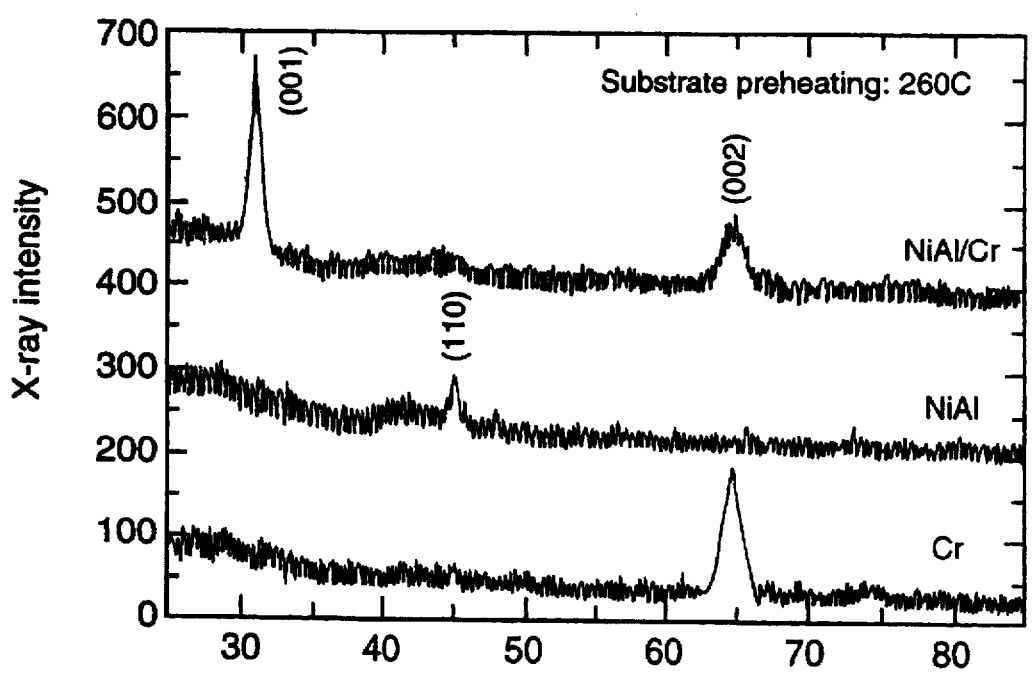
FIG. 22 is an x-ray diffraction spectra of the CoCrPt(40 nm)/Cr(100 nm) and CoCrPt(40 nm)/NiAl(100 nm) films with a 10 nm Cr seed layer and without a seed layer.

Experiments were also conducted to compare a seed layer of Cr to the MgO seed layer. A 10 nm Cr seed layer was prepared on a 260° C. preheated substrate to obtain the (002) texture. The (002) texture was induced in a subsequent NiAl underlayer. FIG. 22 plots the x-ray diffraction spectra of 40 nm CoCrPt/100 nm NiAl films with and without a 10 nm Cr seed layer and a 40 nm CoCrPt/100 nm Cr film. The substrate heating helps to bring out the (002) texture in the NiAl underlayer by improving the (002) texture of the Cr seed layer as well as for a pure Cr underlayer. There was no (002) peak observed in a film with a pure NiAl underlayer. Table III lists the in-plane bulk magnetic properties of the specimens depicted in FIG. 22.

TABLE III

The in-plane magnetic properties of the 40 nm CoCrPt films on 100 nm NiAl, 100 nm Cr and 100 nm NiAl/10 nm Cr underlayers.

| Underlayer | Hc, Oe | S* | S | Mrt, memu/cm$^2$ |
|---|---|---|---|---|
| NiAl | 2221 | 0.79 | 0.81 | 0.81 |
| Cr | 2228 | 0.74 | 0.88 | 0.83 |
| NiAl/Cr | 3153 | 0.78 | 0.85 | 0.84 |

The data show that the coercivity of the CoCrPt film on the NiAl underlayer is significantly increased due to the incorporation of the Cr seed layer, similar to the MgO seed layer. However, lower coercivity squareness and $M_rt$ were observed in the film with a Cr seed layer. With a similar (002) texture, the NiAl underlayer appears to induce a higher coercivity in the CoCrPt film than the Cr underlayer.

Figure 29A:
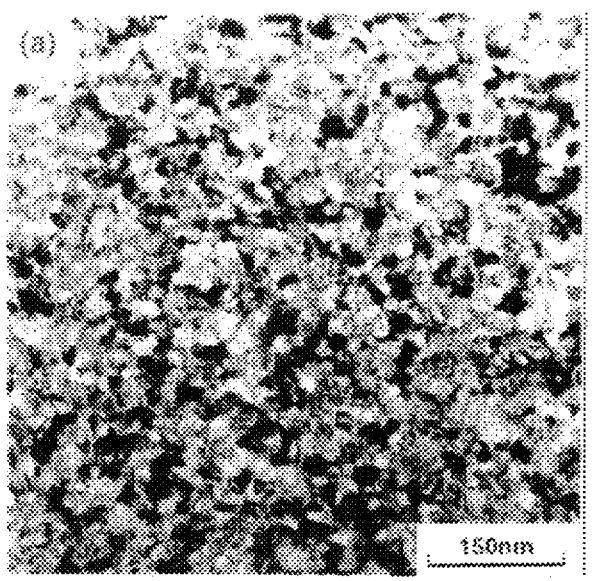
FIG. 29 shows bright field TEM micrographs of CoCrPt (40 nm)/NiAl(100 nm) films on MgO seed layer (a) and on a 10 nm Cr seed layer (b); and, FIG. 30 (a) and (b) are AFM surface plots of 100 nm NiAl films with MgO seed layers of 10 nm (a) and 20 nm (b) on smooth glass substrates.
Figure 29B:
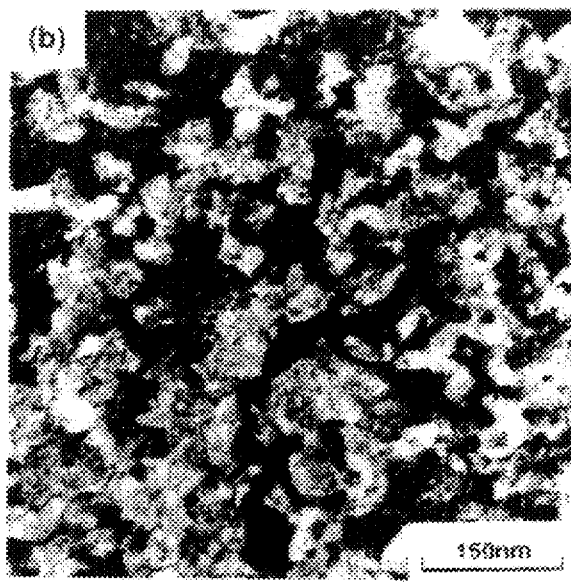

FIG. 29 compares the TEM bright field micrographs of 40 nm CoCrPt/100 nm NiAl films on 5 nm MgO and 10 nm Cr seed layers. Although these plane view micrographs show overlapping NiAl and Co grains, it is apparent that the grain size of the film with a Cr seed layer is more than twice the grain size (180 Å) of the film with a MgO seed layer, most likely due to the fact that added heat is not required in the process of the deposition of the MgO seed layer.

Seed layers of Cr and MgO have been shown to induce the (002) crystallographic texture in the NiAl underlayers which has been shown to be beneficial to the in-plane coercivity of the CoCrPt films. The MgO seed layer, however, does not require heating and therefore, have finer underlayer grains. A sputter deposited thin MgO seed layer with the (002) crystallographic texture induces the (002) texture in both the Cr and NiAl underlayer which in turn induces the (11$\bar{2}$0) texture in the CoCrPt magnetic layer. Thus, the in-plane magnetic properties can be improved without resorting to external substrate heating. By employing the MgO seed layers, the Co alloy films provide greatly improved high density recording media. Also, the surface roughness of the MgO seed layer can be controlled. Hence, the surface roughness of the recording medium can be controlled by the roughness of the MgO layer.

What is claimed:

1. A magnetic recording medium comprising:
   a substrate;
   a seed layer comprised of polycrystalline MgO having an (002) structure deposited on said substrate, wherein said seed layer is between about 1.0 nm to 50 nm thick;
   a Co or Co alloy film forming a magnetic layer; and
   an underlayer comprised of Cr, a Cr alloy having an A2 crystalline structure or material having a B2 crystalline structure disposed between said seed layer and said magnetic layer.

2. The recording medium recited in claim 1 wherein said underlayer is comprised of multiple layers of two or more of said materials.

3. The recording medium recited in claim 1 further comprising a chromium or chromium alloy intermediate layer interposed between said magnetic layer and said underlayer, and wherein said underlayer and said intermediate layer comprise different materials.

4. The recording medium recited in claim 3 wherein said intermediate layer is about 1.0 nm to about 5.0 nm thick.

5. The recording medium recited in claim 1 further comprising an overcoat disposed on said film, such that said magnetic layer lies between said underlayer and said overcoat.

6. The recording medium recited in claim 5 further comprising an organic lubricant disposed on said overcoat such that said overcoat lies between said lubricant and said magnetic layer.

7. The recording medium recited in claim 6 further comprising an overlayer disposed on said magnetic layer such that said overlayer lies between said magnetic layer and said overcoat.

8. The recording medium recited in claim 1 wherein said seed layer is between about 1.0 to 20 nm thick.

9. The recording media recited in claim 1 wherein said seed layer has a surface adjacent said underlayer, said seed layer surface being roughened to effect a maximum surface roughness of about 50 to 200 Å in said magnetic layer.

10. In a magnetic recording medium having a substrate and a magnetic layer, the improvement comprising:
   an underlayer comprised of Cr, a Cr alloy having an A2 crystalline structure or material having a B2 crystalline structure disposed between the substrate and the magnetic layer; and a seed layer disposed between said substrate and said underlayer, said seed layer being comprised of polycrystalline MgO having an (002) structure deposited on said substrate and seed layer having a thickness of between about 1.0 nm to 50 nm thick.

11. The improvement recited in claim 10 wherein said seed layer is between about 2.5 to 20 nm thick.

12. The improvement recited in claim 10 wherein said seed layer forms a substantially continuous layer.

13. The improvement recited in claim 10 further comprising a chromium or chromium alloy intermediate layer interposed between said magnetic layer and said underlayer.

14. The improvement recited in claim 10 wherein said underlayer is comprised of a material selected from the group consisting of Cr, CrV, CrTi, CrMo, NiAl, AlCo, FeAl, FeTi, CoFe, CoTi, CoHf, CoZr, NiTi, CuBe, CuZn, AlMn, AlRe, AgMg and Al$_2$FeMn$_2$.

15. An apparatus for recording and reading magnetic data comprising:
a rotatable disc, said disc comprising
a substrate,
a seed layer comprised of polycrystalline MgO having an (002) structure deposited on said substrate, wherein said seed layer is between about 1.0 nm to 50 nm thick,
a Co or Co alloy film forming a magnetic layer, and
an underlayer comprised of Cr, a Cr alloy having an A2 crystalline structure or material having a B2 crystalline structure disposed between said seed layer and said magnetic layer;
a magnetic transducing head; and,
means for supporting said head in close proximity to said disc and said magnetic layer for controlled movement of said head relative to said disc.

16. The apparatus recited in claim 15 wherein said disc further comprises a chromium or chromium alloy intermediate layer interposed between said magnetic layer and said underlayer of said disc, and wherein said underlayer and said intermediate layer comprise different materials.

17. A magnetic recording medium comprising:
a substrate;
a seed layer comprised of MgO having an (002) structure sputter deposited on said substrate, wherein said seed layer is between about 1.0 nm to 50 nm thick;
a Co or Co alloy film forming a magnetic layer; and,
an underlayer comprised Cr, a Cr alloy having an A2 structure or a material having a B2 crystalline structure selected from the group consisting of NiAl, AlCo, FeAl, FeTi, CoFe, CoTi, CoHf, CoZr, NiTi, CuBe, CuZn, AlMn, AlRe, AgMg and Al$_2$FeMn$_2$ disposed between said seed layer and said magnetic layer.

18. An apparatus for recording and reading magnetic data comprising:
a rotatable disc, said disc comprising a substrate, a seed layer comprised of MgO having an (002) structure sputter deposited on said substrate, a Co or Co alloy film forming a magnetic layer, and an underlayer comprised of Cr, a Cr alloy having an A2 structure or a material having a B2 crystalline structure selected from the group consisting of NiAl, AlCo, FeAl, FeTi, CoFe, CoTi, CoHf, CoZr, NiTi, CuBe, CuZn, AlMn, AlRe, AgMg and Al$_2$FeMn$_2$ disposed between said seed layer and said magnetic layer, wherein said seed layer is between about 1.0 nm to 50 nm thick;
a magnetic transducing head; and,
means for supporting said head in close proximity to said disc for controlled movement of said head over the surface of said disc.

19. The recording medium recited in claim 1, wherein said underlayer is comprised of a material selected from the group consisting of NiAl, AlCo, FeAl, FeTi, CoFe, CoTi, CoHf, CoZr, NiTi, CuBe, CuZn, AlMn, AlRe, AgMg and Al$_2$FeMn$_2$.

20. The recording medium recited in claim 1, wherein said underlayer is comprised of a material selected from the group consisting of NiAl and FeAl.

21. The apparatus recited in claim 15, wherein said underlayer is comprised of a material selected from the group consisting of NiAl, AlCo, FeAl, FeTi, CoFe, CoTi, CoHf, CoZr, NiTi, CuBe, CuZn, AlMn, AlRe, AgMg and Al$_2$FeMn$_2$.

22. The apparatus recited in claim 15, wherein said underlayer is comprised of a material selected from the group consisting of NiAl, and FeAl.

23. A method of producing a magnetic recording medium comprising:
depositing polycrystalline MgO onto the substrate to form a seed layer having a (002) orientation that is between about 1.0 nm to 50 nm thick;
depositing an underlayer comprised of Cr or a Cr alloy having an A2 structure or material having a B2 structure; and,
forming a Co or Co alloy magnetic layer, wherein the underlayer is disposed between the seed layer and the magnetic layer.

24. The method of claim 23 wherein:
said step of depositing an underlayer comprises depositing an underlayer comprised of a material selected from the group consisting of Cr, CrV, CrTi, CrMo, NiAl, AlCo, FeAl, FeTi, CoFe, CoTi, CoHf, CoZr, NiTi, CuBe, CuZn, AlMn, AlRe, AgMg and Al$_2$FeMn$_2$; and,
said step of forming further comprises forming the magnetic layer having a (1120) orientation on the underlayer.

25. A method of producing an oriented underlayer between a substrate and a magnetic layer in a magnetic media comprising:
sputtering MgO onto the substrate to form a polycrystalline seed layer having a (002) orientation that is between about 1.0 nm to 50 nm thick; and
depositing an underlayer comprised of Cr or a Cr alloy having an A2 structure or material having a B2 structure, wherein the underlayer is disposed between the seed layer and the magnetic layer.

26. The method of claim 25, wherein said step of sputtering comprises radio frequency sputtering.

* * * * *